(12) United States Patent
Sharma et al.

(10) Patent No.: US 11,681,627 B1
(45) Date of Patent: Jun. 20, 2023

(54) DISTRIBUTED TEMPORAL CACHE FOR SYSTEMS ON A CHIP

(71) Applicant: Meta Platforms Technologies, LLC, Menlo Park, CA (US)

(72) Inventors: Sridhar Gurumurthy Isukapalli Sharma, Palo Alto, CA (US); Drew Eric Wingard, Palo Alto, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/504,292

(22) Filed: Oct. 18, 2021

(51) Int. Cl.
*G06F 12/08* (2016.01)
*G06F 12/0864* (2016.01)
*G06F 12/0891* (2016.01)
*G06F 3/01* (2006.01)
*G06F 15/78* (2006.01)
*G06F 12/02* (2006.01)

(52) U.S. Cl.
CPC .......... *G06F 12/0864* (2013.01); *G06F 3/012* (2013.01); *G06F 12/0246* (2013.01); *G06F 12/0891* (2013.01); *G06F 15/7807* (2013.01)

(58) Field of Classification Search
None
See application file for complete search history.

(56) References Cited

U.S. PATENT DOCUMENTS

| 6,584,547 B2* | 6/2003 | Palanca | G06F 12/0875 711/155 |
| 2015/0269083 A1* | 9/2015 | Koker | G06F 12/0875 711/136 |
| 2019/0121740 A1* | 4/2019 | Kabra | G06F 12/10 |
| 2021/0406191 A1* | 12/2021 | Radi | G06F 12/0891 |
| 2021/0409506 A1* | 12/2021 | Radi | H04L 43/16 |
| 2022/0385732 A1* | 12/2022 | Radi | H04L 43/028 |

\* cited by examiner

*Primary Examiner* — Kevin Verbrugge
(74) *Attorney, Agent, or Firm* — Shumaker & Sieffert, P.A.

(57) ABSTRACT

A system and method for accessing cache lines of an N-way set associative cache distributed across local memory of compute elements. The set associative cache includes a plurality of sets, with each location in cacheable local memory mapped to one of the sets and each set including N locations for caching data blocks read from the cacheable memory. Each set is mapped to one of the local memories, when that local memory is not in use by local compute elements. A cache controller is configured to receive a read request, to identify a data block in the cacheable memory associated with the address, to determine if the identified data block is in cache in one of the local memories, and, if the identified data block is in cache in one of the local memories, to fetch the identified data block from the cache.

20 Claims, 11 Drawing Sheets

DISTRIBUTED TEMPORAL CACHE FOR SYSTEMS ON A CHIP

TECHNICAL FIELD

This disclosure generally relates to memory architecture and, in particular, to globally addressable memory distributed on-die among compute elements as local memories.

BACKGROUND

Computing systems use volatile memory such as Static Random-Access Memory (SRAM) to store executable code and data while the system is in operation. SRAM is considered volatile because, although SRAM uses latching circuitry to store each data bit, the data stored in SRAM is lost when power is removed.

Systems on a Chip (SoCs) often dedicate a large portion of die area to SRAM. On-die SRAM provides very large bandwidth, low latency and lower power memory solutions. Such solutions, however, often are distributed in nature. That is, portions of the on-die SRAM distributed as local memory are located close to the compute element or compute elements that use the memory. Such an approach allows for very wide and as a consequence high bandwidth, low latency interfaces, while minimizing energy spent in communicating across long wires on the die. Latency may, however, become an issue when sharing distributed local memory with compute elements that are not located close to the memory as this will necessitate narrower connections to avoid large number of traces running across the die.

An artificial reality system is one type of computer system that relies on nonvolatile memories such as SRAM. In general, artificial reality is a form of reality that has been adjusted in some manner before presentation to a user, which may include, e.g., a virtual reality, an augmented reality, a mixed reality, a hybrid reality, or some combination and/or derivatives thereof. Artificial reality systems include one or more devices for rendering and displaying content to users. Examples of artificial reality systems may incorporate a head-mounted display (HMD) worn by a user and configured to output artificial reality content to the user. In some examples, the HMD may be coupled (e.g., wirelessly or in tethered fashion) to a peripheral device that performs one or more artificial reality-related functions.

SUMMARY

In general, this disclosure is directed to techniques for efficiently sharing on-die memory that is physically distributed among compute elements as local memory. For example, a low power System-on-a-Chip (SoC) may have systems and subsystems that each incorporates SRAM distributed as a local memory. A cache may be used to efficiently share a particular local memory with compute elements that are not part of the subsystem in which the local memory is located, e.g., compute elements that are located in other subsystems of the SoC. In one example approach, the cache may be a set-associative cache. In one example approach, the cache may be an extension of an existing system cache.

The techniques described herein may be implemented on an SoC that has multiple subsystems for performing various functions of the system. Examples of such subsystems include system control subsystems, communications subsystems, security subsystems, video processing subsystems, etc. Some of the subsystems may not need to be powered on at all times. For example, as discussed above, a video subsystem need not be powered on if a camera on the system is not in use.

In one example, a video subsystem runs at a frame rate such as 30 Hz or 45 Hz. Processing required may, however, be completed in a fraction of the frame time. The memory in the video subsystem is, therefore, available to be reclaimed as system cache when not in use.

In one example approach, a system on a chip (SoC) includes a plurality of local memories, including a first local memory and a second local memory; a first subsystem comprising a first compute element and the first local memory, the first compute element connected to the first local memory; a second subsystem comprising a second compute element and the second local memory, the second compute element connected to the second local memory; and an N-way set associative cache controller, the set associative cache controller controlling an N-way set associative cache having a plurality of sets, wherein each location in a cacheable memory accessible to the SoC is mapped to one of the sets, wherein each set includes N locations for caching data blocks read from the cacheable memory, wherein N is an integer greater than one. Sets from the N-way set associative cache are mapped to one or more of the plurality of local memories when the respective local memories are not being used by local compute elements. The set associative cache controller is configured to receive a read request having an address, to identify a data block in the cacheable memory associated with the address, to determine if the identified data block is in cache in one of the plurality of local memories, and, if the identified data block is in cache in one of the plurality of local memories, to fetch the identified data block from the cache. If the identified data block is not in cache in one of the plurality of local memories, the set associative cache controller is further configured to fetch the identified data block from the cacheable memory.

In another example approach, an artificial reality system includes a head mounted display (HMD) configured to output artificial reality content, the HMD including a display and at least one system on a chip (SoC), wherein the at least one SoC comprises a plurality of local memories, including a first local memory and a second local memory; a first subsystem comprising a first compute element and the first local memory, the first compute element connected to the first local memory; a second subsystem comprising a second compute element and the second local memory, the second compute element connected to the second local memory; and an N-way set associative cache controller, the set associative cache controller controlling an N-way set associative cache having a plurality of sets, wherein each location in a cacheable memory accessible to the SoC is mapped to one of the sets, wherein each set includes N locations for caching data blocks read from the cacheable memory, wherein N is an integer greater than one. Sets from the N-way set associative cache are mapped to one of the plurality of local memories and the set associative cache controller is configured to receive a read request having an address, to identify a data block in the cacheable memory associated with the address, to determine if the identified data block is in cache in one of the plurality of local memories, and, if the identified data block is in cache in one of the plurality of local memories, to fetch the identified data block from the cache. If the identified data block is not in cache in one of the plurality of local memories, the set associative cache controller is further configured to fetch the identified data block from the cacheable memory. When the first compute element is executing an application in the first local memory, the set associative cache is further configured to disable from caching sets of the cache mapped to the first local memory and when the second compute element is executing an application in the second local memory, the set associative cache is further configured to disable from caching sets of the cache mapped to the second local memory.

In yet another example approach, in a system on a chip (SoC) has on-chip memory, cacheable memory and an N-way set associative cache controller having a plurality of sets, wherein the on-chip memory includes local memory distributed among a plurality of subsystems, a method of caching data from the cacheable memory in the local memory includes receiving a read request from a processor, the read request having an address; identifying, based on the address, a set and a tag associated with the address; accessing a TAG memory associated with the set of the address to determine if data associated with the address is stored in the distributed local memory; if the data associated with the address is not stored in cache in the local memory and the local memory is not being used by a local compute element, reading the data associated with the address from the cacheable memory, forwarding the data read to the processor, storing the data in one of the N way locations of the set associated with the address, and storing the tag from the address in the TAG memory at the same respective way location; and if the data associated with the address is stored in cache in the local memory, reading data from the cache in the local memory based on the address in the read request and forwarding the data to the processor.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
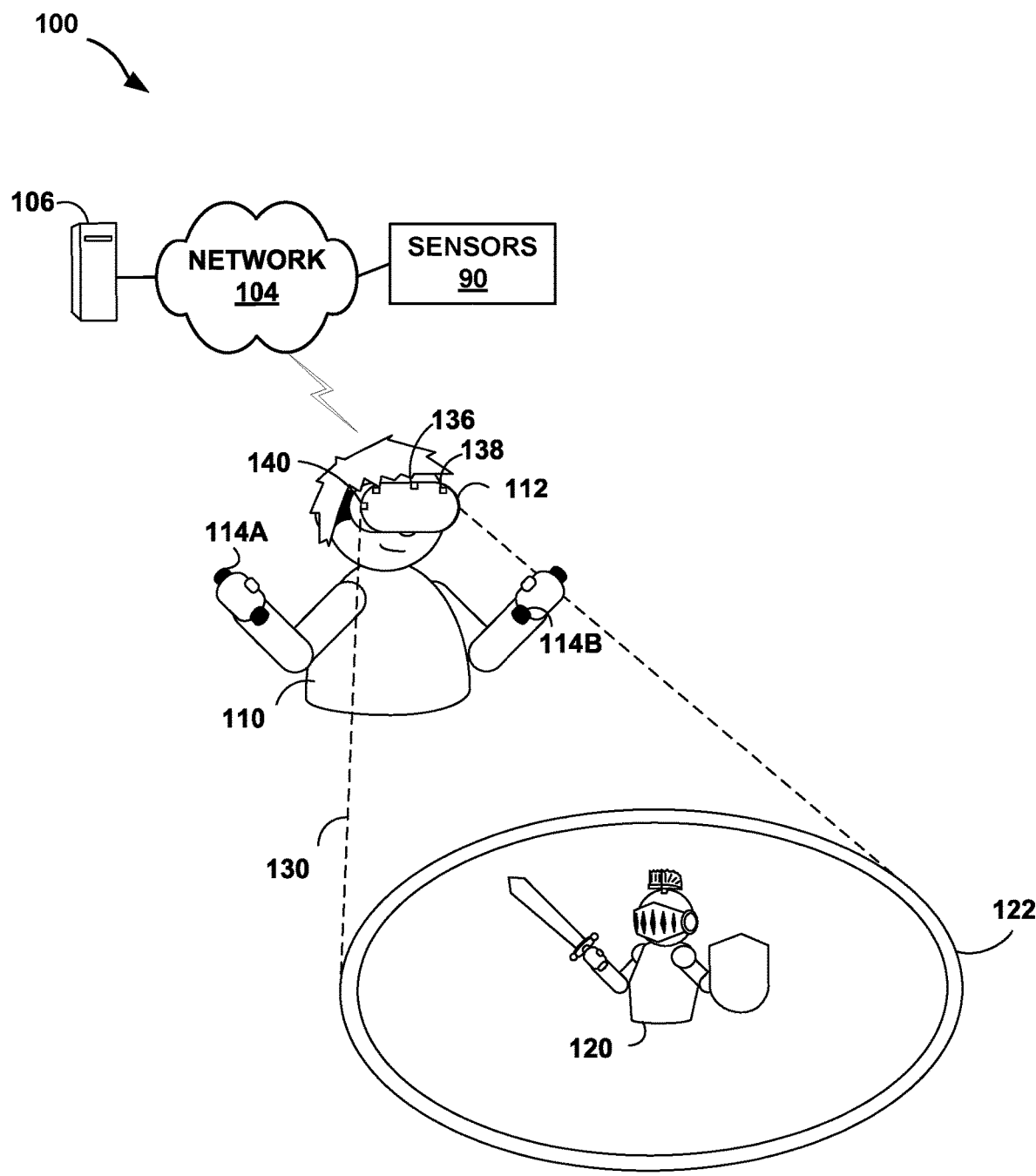
FIG. 1 is an illustration depicting an example artificial reality system that includes an SoC having compute elements and local memory shared by the compute elements, in accordance with techniques described in this disclosure.

FIG. 1 is an illustration depicting an example artificial reality system that includes a system on a chip (SoC) having compute elements and local memory shared by the compute elements, in accordance with techniques described in this disclosure. The artificial reality system may be a virtual reality system, an augmented reality system, or a mixed reality system. In the example of FIG. 1, artificial reality system 100 includes a head mounted display (HMD) 112, one or more controllers 114A and 114B (collectively, "controller(s) 114"), and may in some examples include one or more external sensors 90 and/or a console 106.

HMD 112 is typically worn by user 110 and includes an electronic display and optical assembly for presenting artificial reality content 122 as virtual objects 120 to user 110. In addition, HMD 112 includes an internal control unit 140 and one or more sensors 136 (e.g., accelerometers) for tracking motion of the HMD 112. In one example approach, internal control unit 140 includes one or more SoCs, each SoC including two or more compute elements and memory distributed among specific compute elements but accessible to other compute elements as detailed below. HMD 112 may further include one or more image capture devices 138 (e.g., cameras, line scanners) for capturing image data of the surrounding physical environment. Although illustrated as a head-mounted display, AR system 100 may alternatively, or additionally, include glasses or other display devices for presenting artificial reality content 122 to user 110.

Each of controller(s) 114 is an input device that user 110 may use to provide input to console 106, HMD 112, or another component of AR system 100. Controller 114 may include one or more presence-sensitive surfaces for detecting user inputs by detecting a presence of one or more objects (e.g., fingers, stylus) touching or hovering over locations of the presence-sensitive surface. In some examples, controller(s) 114 may include an output display, which, in some example, may be a presence-sensitive display. In some examples, controller(s) 114 may be a smartphone, tablet computer, personal data assistant (PDA), or other hand-held device. In some examples, controller(s) 114 may be a smartwatch, smart ring, or other wearable device. Controller(s) 114 may also be part of a kiosk or other stationary or mobile system. Alternatively, or additionally, controller(s) 114 may include other user input mechanisms, such as one or more buttons, triggers, joysticks, D-pads, or the like, to enable a user to interact with and/or control aspects of the artificial reality content 122 presented to user 110 by AR system 100.

In this example, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as being in communication with, e.g., tethered to or in wireless communication with, console 106, in some implementations HMD 112 operates as a stand-alone, mobile AR system, and AR system 100 may omit console 106.

In general, AR system 100 renders artificial reality content 122 for display to user 110 at HMD 112. In the example of FIG. 1, a user 110 views the artificial reality content 122 constructed and rendered by an artificial reality application executing on compute elements withing HMD 112 and/or console 106. In some examples, the artificial reality content 122 may be fully artificial, i.e., images not related to the environment in which user 110 is located. In some examples, artificial reality content 122 may comprise a mixture of real-world imagery (e.g., a hand of user 110, controller(s) 114, other environmental objects near user 110) and virtual objects 120 to produce mixed reality and/or augmented reality. In some examples, virtual content items may be mapped (e.g., pinned, locked, placed) to a particular position within artificial reality content 122, e.g., relative to real-world imagery. A position for a virtual content item may be fixed, as relative to one of a wall or the earth, for instance. A position for a virtual content item may be variable, as relative to controller(s) 114 or a user, for instance. In some examples, the particular position of a virtual content item within artificial reality content 122 is associated with a position within the real-world, physical environment (e.g., on a surface of a physical object).

During operation, the artificial reality application constructs artificial reality content 122 for display to user 110 by tracking and computing pose information for a frame of reference, typically a viewing perspective of HMD 112. Using HMD 112 as a frame of reference, and based on a current field of view as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112 and/or controllers 114, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

AR system 100 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. The artificial reality application may render images of real-world objects, such as the portions of a peripheral device, the hand, and/or the arm of the user 110, that are within field of view 130 along with virtual objects 120, such as within artificial reality content 122. In other examples, the artificial reality application may render virtual representations of the portions of a peripheral device, the hand, and/or the arm of the user 110 that are within field of view 130 (e.g., render real-world objects as virtual objects 120) within artificial reality content 122. In either example, user 110 is able to view the portions of their hand, arm, a peripheral device and/or any other real-world objects that are within field of view 130 within artificial reality content 122. In other examples, the artificial reality application may not render representations of the hand or arm of user 110.

To provide virtual content alone, or overlaid with real-world objects in a scene, HMD 112 may include a display system. For example, the display may include a projector and waveguide configured to translate the image output by the projector to a location viewable by a user's eye or eyes. The projector may include a display and a projector lens. The waveguide may include an input grating coupler to redirect light from the projector into the waveguide, and the waveguide may "trap" the light via total internal reflection (TIR). For example, the display may include arrays of red, green, and blue LEDs. In some examples, a color image may be formed by combination of the red, green, and blue light from each of the red, green, and blue LED arrays via a combiner. The waveguide may include an output grating to redirect light out of the waveguide, for example, towards an eye box. In some examples, the projector lens may collimate light from the display, e.g., the display may be located substantially at a focal point of the projector lens. The grating coupler may redirect the collimated light from the display into the waveguide, and the light may propagate within the waveguide via TIR at the surfaces of the waveguide. The waveguide may include an output structure, e.g., holes, bumps, dots, a holographic optical element (HOE), a diffractive optical element (DOE), etc., to redirect light from the waveguide to a user's eye, which focuses the collimated light from the display of the projector on the user's retina, thereby reconstructing the display image on the user's retina. In some examples, the TIR of the waveguide functions as a mirror and does not significantly affect the image quality of the display, e.g., the user's view of the display is equivalent to viewing the display in a mirror.

As further described herein, one or more devices of artificial reality system 100, such as HMD 112, controllers 114 and/or a console 106, may include SoCs. Further, one of more of the SoCs may include an SoC having compute elements and on-die memory collocated with the compute elements. In one example approach, an SoC includes two or more subsystems. Each subsystem includes compute elements (processors or coprocessors) and corresponding memory collocated with the compute elements. In some such SoCs, portions of the on-die SRAM are physically distributed throughout the SoC as Local Memory (LMEM), with a different instance of LMEM located close to each compute element. Such an approach allows for very wide, high bandwidth and low latency interfaces to the closest compute elements, while minimizing energy spent in communicating across long wires on the die.

Local Memory may be idle. For example, in some use cases (such as in Graphics, Computer vision, or Machine Learning inference work), processing occurs at a deterministic frame rate (such as, for example, 30 Hz or 45 Hz). There is a duty cycle for the active compute, where the SRAM is actively used, and an idle or sleep state where the SRAM is not used. This results in dark silicon (i.e., sections of memory that sit idle for periods of time—regions of the die that increase die cost (by consuming area when not in use) or (worse) consume power needlessly when idle). In such use cases, once the subsystem finishes the compute for a given phase of an application (e.g., performing processing requires for a frame interval), the LMEM within the subsystem is not immediately needed and can be made available to other compute elements for use. Here, however, the very wide, high bandwidth, low latency connection to the local compute element may, in some cases, give way to a more limited interface when sharing Local Memory with compute elements that are located further away from the Local Memory. Nevertheless, the inherent speed and the significant power savings of on-die memory makes it advantageous to share Local Memory with other compute elements.

Another issue that occurs with sharing physically distributed LMEMs among local computes physically distributed among different subsystems is that the total amount of processing and data movement that each subsystem requires to complete their tasks may vary based on local conditions (i.e., the time when the SRAM becomes available varies, for instance, frame to frame). This issue makes it difficult to transition efficiently from Local Memory to memory shared with other compute elements, and back.

One option is to map these LMEMs as shared memory. Due to the temporal nature of use of Local Memory, however, it may be very hard for the software to effectively use this memory, for the memory allocation will be dependent on whether the memory is being used by the subsystem where it is located.

One method for reusing on-die Local Memory is to map the Local Memory into the addressing scheme used for references to off-die memory. For instance, one might alter the SoC address mapping hardware to either drop that SRAM address region from the map or map it to DRAM. In either case, persistent data in the SRAM should be copied to the associated area of DRAM when the LMEM is freed for used by an associated compute element.

Another method when there is no virtual memory available would be to have alternate memory address maps. At a very high level, the data used by a program may be split into statically allocated global data regions: the initialized DATA segment and the zero-initialized BSS segment and the runtime allocated memory—in other words, the stack and the heap. The data regions may be relocated from external memory to on-die SRAM whenever it becomes available and then relocated back to the data region when the on-die SRAM is needed for higher priority uses. This entails copying the region from external memory to on-die SRAM and vice versa (since a shared memory approach does not track the sections of SRAM that have been modified and, therefore, need to be copied back into external memory). This approach leads to excessive external memory data traffic and, as a consequence, leads to significant energy and power being expended. Also, it may require that the processing be halted while the data is being relocated.

Another method for sharing Local Memory virtualizes the memory (i.e., by adding a memory management unit (MMU), which will either point to the on-die SRAM or to a backend store in external memory. The simplification is that instead of having two distinct data regions specified in a linker command file, the MMU entry may need to be programmed. The copy operation still needs to be performed. In one example approach, the on-die SRAM may be partitioned into pages and, whenever the on-die SRAM becomes available, the contents of the page(s) are copied from external memory to on-die SRAM and vice versa when the on-die SRAM is needed locally.

A cache helps to overcome issues such as the copy penalty of transitions between local and shared memory and the burden of maintaining multiple memory maps, as described above. In one such example approach, a set-associative cache may be used to efficiently share Local Memory between compute elements. In a set-associative cache, the addresses used to access off-die memory are clustered in sets, with each set assigned a fixed number of locations used to temporarily store blocks of data from the memory locations of addresses within the set of addresses. In an N-way set associative cache, each set includes N different locations that may be used to temporarily store copies of blocks from within the set, where N is greater than or equal to two. Each block in the memory maps to a unique set in the cache given by an index field; the block may be placed in any of the elements (ways) of the set. In one example approach, the most significant bits of the address are used as the index field. That is, the set containing a block is given by the block number modulo number of sets in the cache. A block is directly mapped into a set, then all the blocks in the set are searched for a match.

In one example approach, on-die SRAM is partitioned into the same sized sets as the system cache, while the number of ways is increased, where each way of the cache includes a data block along with the valid and tag bits for the data block. When a portion of on-die SRAM is required for Local Memory, the ways are removed from the system cache. Ways that are transitioning from cache→SRAM may be flushed and invalidated. On the transitions from SRAM-→cache, in some cases the data stored in the SRAM is not needed as the data does not need to be preserved. In other cases, the SRAM data may have to be copied to a backing store and the TAG RAM invalidated prior to reuse as a cache.

There are advantages with using a cache instead of treating the on-die SRAM as a shared memory. The first advantage is that it is easier for the software that manages the memory allocations. There is no need to manage multiple data sections in cached regions. Instead, on-die SRAM may be treated as a unified memory model. In one example approach, the set-associative cache may be an extension of an existing system cache.

The second advantage is that each cache line has attributes that indicate whether the cache line has been modified (i.e., dirty cache line bits). This helps with the amount of external memory bandwidth needed when the transition occurs, as only dirty cache lines need to be written back to external memory. As an example, assume that the entire data section is resident in the cache. Instead of having to copy the entire section to memory, only the dirty cache lines are copied to external memory on a transition.

Two example architectures for the distributed cache architecture for one or more SoCs of artificial reality system 100 will be described. In a first architecture, the TAGs are centralized but the cache memories are distributed. The advantage of this architecture is that since the tag RAMs are centralized there are no distributed coherency issues that need to be dealt with.

In a second architecture, TAG RAM is placed next to each SRAM Local Memory. Such an approach may lead to distributed coherency issues and/or memory address map implications. Also, it may be more difficult to create a set-associative cache structure when the ways are distributed.

Three different approaches for distributing the ways are also described. In a first approach, the TAG RAM lookup is distributed. This greatly complicates the design and adds a lot of latency to the system. In a second approach, the cache lines are distributed across the different caches so that there are no coherency or lookup issues. This works if all SRAM associated with the caches are available all the time. In some scenarios, however, cache availability is temporal. In a third approach, the memory space is partitioned into disjointed regions and distributed caches deal with these distinct regions of the memory space so that there is no overlap and no issues with coherency or distributed lookups. When the on-die SRAM is needed, the appropriate cache may be flushed and taken out of service. The corresponding memory region then becomes uncacheable.

Figure 2A:
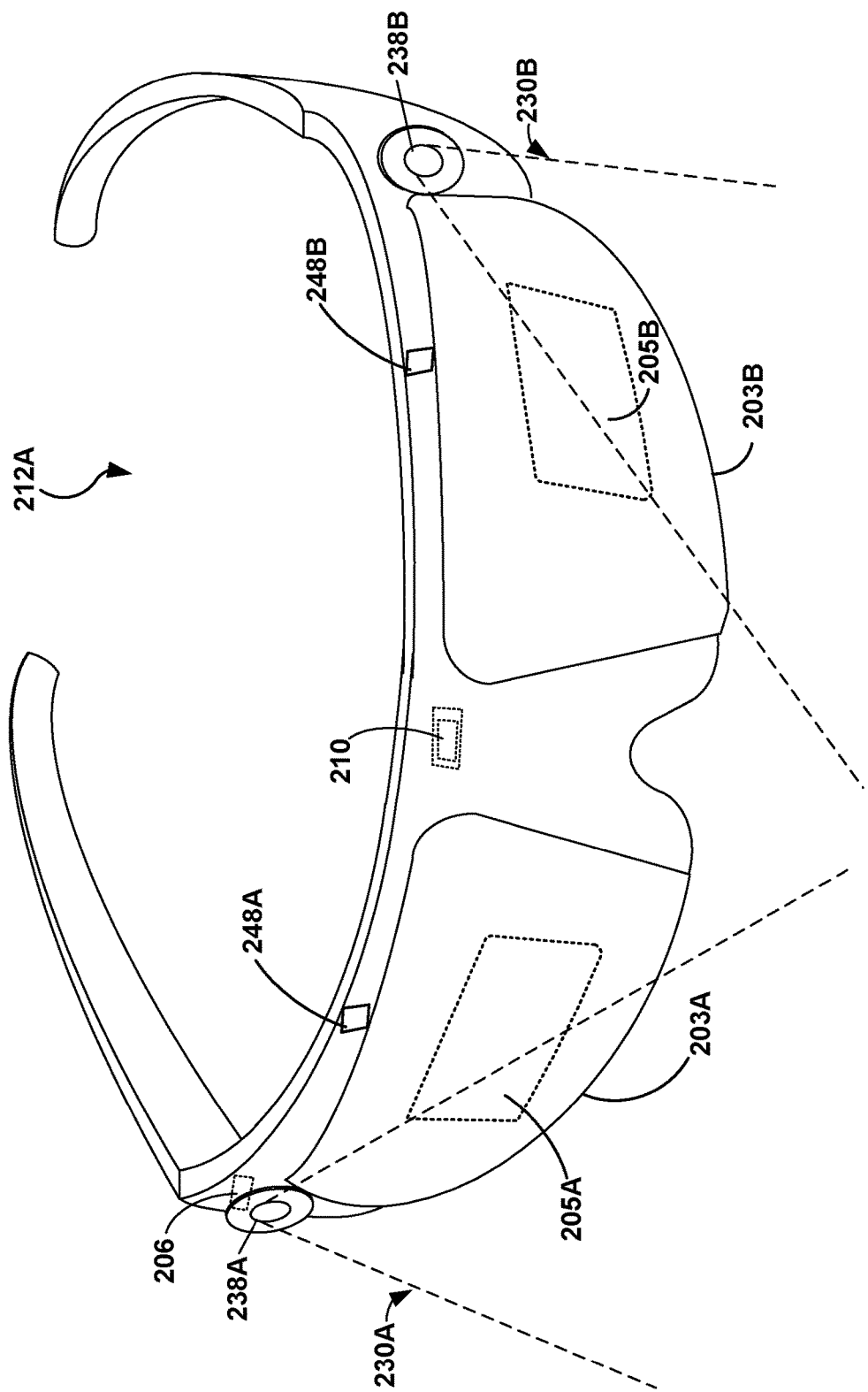
FIG. 2A is an illustration depicting an example HMD having compute elements and local memory shared by the compute elements, in accordance with techniques described in this disclosure.

FIG. 2A is an illustration depicting an example HMD having compute elements and local memory shared by the compute elements, in accordance with techniques described in this disclosure. HMD 212A of FIG. 2A may be an example of HMD 112 of FIG. 1. As shown in FIG. 2A, HMD 212A may take the form of glasses. HMD 212A may be part of an artificial reality system, such as AR system 100 of FIG. 1, or may operate as a stand-alone, mobile artificial realty system configured to implement the techniques described herein.

In this example, HMD 212A are glasses comprising a front frame including a bridge to allow the HMD 212A to rest on a user's nose and temples (or "arms") that extend over the user's ears to secure HMD 212A to the user. In addition, HMD 212A of FIG. 2A includes one or more projectors 248A and 248B, one or more waveguides 203A and 203B (collectively, "waveguides 203") and one or more waveguide output structures 205A and 205B (collectively, "waveguide output structures 205") configured to redirect light out of the waveguides 203A and 203B. In the example shown, projectors 248A and 248B (collectively, "projectors 248") may input light, e.g., collimated light, into waveguides 203A and 203B via a grating coupler (not shown) that redirects light from the projectors 248 into waveguides 203 such that the light is "trapped" via total internal reflection (TIR) within the waveguide. For example, projectors 248A and 248B may include a display and a projector lens. In some examples, waveguides 203 may be transparent and alternatively may be referred to as "windows 203" hereinafter. In some examples, the known orientation and position of windows 203 relative to the front frame of HMD 212A is used as a frame of reference, also referred to as a local origin, when tracking the position and orientation of HMD 212A for rendering artificial reality content according to a current viewing perspective of HMD 212A and the user. In some examples, projectors 248 can provide a stereoscopic display for providing separate images to each eye of the user.

In the example shown, waveguide output structures 205 cover a portion of the windows 203, subtending a portion of the field of view 230 viewable by a user 110 through the windows 203. In other examples, the waveguide output structures 205 can cover other portions of the windows 203, or the entire area of the windows 203.

As further shown in FIG. 2A, in this example, HMD 212A further includes one or more motion sensors 206, one or more integrated image capture devices 238A and 238B (collectively, "image capture devices 238"), an internal control unit 210, which may include an internal power source and one or more printed-circuit boards having one or more processors, memory, and hardware to provide an operating environment for executing programmable operations to process sensed data and present artificial reality content on waveguide output structures 205. Internal control unit 210 may include an SoC in accordance with the present disclosure that receives information from one or more of sensor(s) 206, image capture devices 238, controller(s) such as controller(s) 114 as shown in FIG. 1, and/or other sensors, and that forms part of a computing system to process the sensed data and present artificial reality content on waveguide output structures 205 in accordance with the present disclosure. In one example approach, each SoC includes two or more compute elements and memory distributed among specific compute elements but accessible to other compute elements as detailed below.

Image capture devices 238A and 238B (collectively, "image capture devices 238") may include devices such as video cameras, laser scanners, Doppler radar scanners, depth scanners, or the like, configured to output image data representative of the physical environment. More specifically, image capture devices 238 capture image data representative of objects in the physical environment that are within a field of view 230A, 230B of image capture devices 238, which typically corresponds with the viewing perspective of HMD 212A.

Figure 2B:
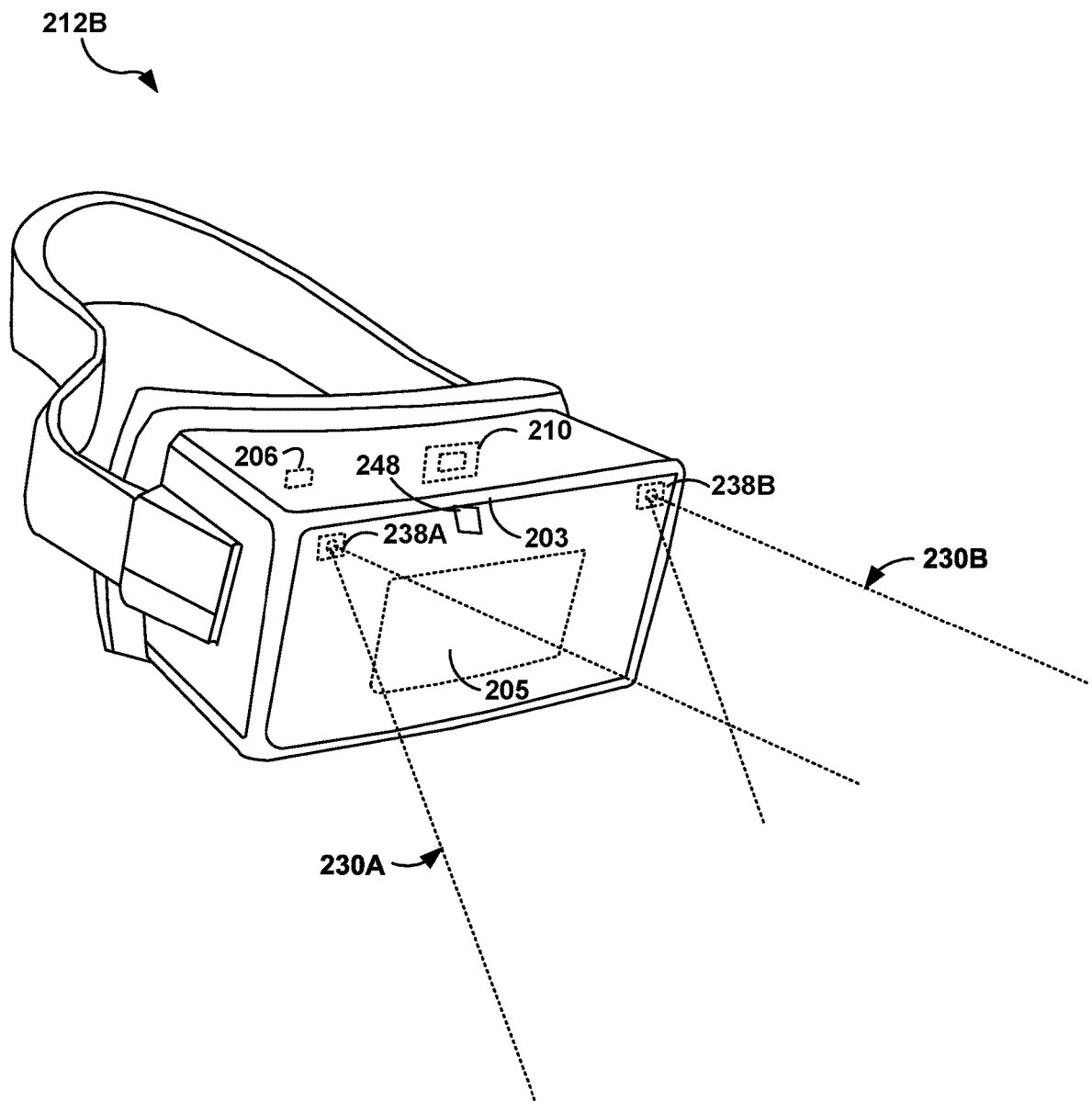
FIG. 2B is an illustration depicting another example HMD that includes an SoC having compute elements and local memory shared by the compute elements, in accordance with techniques described in this disclosure.

FIG. 2B is an illustration depicting another example HMD that includes an SoC having compute elements and local memory shared by the compute elements, in accordance with techniques described in this disclosure. HMD 212B may be part of an artificial reality system, such as artificial reality system 100 of FIG. 1, or may operate as a stand-alone, mobile artificial realty system configured to implement the techniques described herein.

In this example, HMD 212B includes a front rigid body and a band to secure HMD 212B to a user. In addition, HMD 212B includes a waveguide 203 (or, alternatively, a window 203) configured to present artificial reality content to the user via a waveguide output structure 205. In the example shown, projector 248 may input light, e.g., collimated light, into waveguide 203 via an input grating coupler (not shown) that redirects light from projector(s) 248 into waveguide 203 such that the light is "trapped" via total internal reflection (TIR) within waveguide 203. For example, projector 248 may include a display and a projector lens. In some examples, the known orientation and position of waveguide 203 relative to the front rigid body of HMD 212B is used as a frame of reference, also referred to as a local origin, when tracking the position and orientation of HMD 212B for rendering artificial reality content according to a current viewing perspective of HMD 212B and the user. In other examples, HMD 212B may take the form of other wearable head mounted displays, such as glasses or goggles.

Similar to HMD 212A of FIG. 2A, the example HMD 212B shown in FIG. 2B further includes one or more motion sensors 206, one or more integrated image capture devices 238A and 238B, an internal control unit 210, which may include an internal power source and one or more printed-circuit boards having one or more processors, memory, and hardware to provide an operating environment for executing programmable operations to process sensed data and present artificial reality content on waveguide output structure 205. Internal control unit 210 may include an SoC in accordance with the present disclosure that receives information from one or more of sensor(s) 206, image capture devices 238, controller(s) such as controller(s) 114 as shown in FIG. 1, and/or other sensors, and that forms part of a computing system to process the sensed data and present artificial reality content on waveguide output structures 205 in accordance with the present disclosure. In one example approach, each SoC includes two or more compute elements and memory distributed among specific compute elements but accessible to other compute elements as detailed below.

In accordance with the techniques of the present disclosure, portions of system-wide memory for SoCs of HMD 212A, 212B may be cached in local memory associated with compute elements of the SoCs when the local memory is available for caching.

Figure 3:
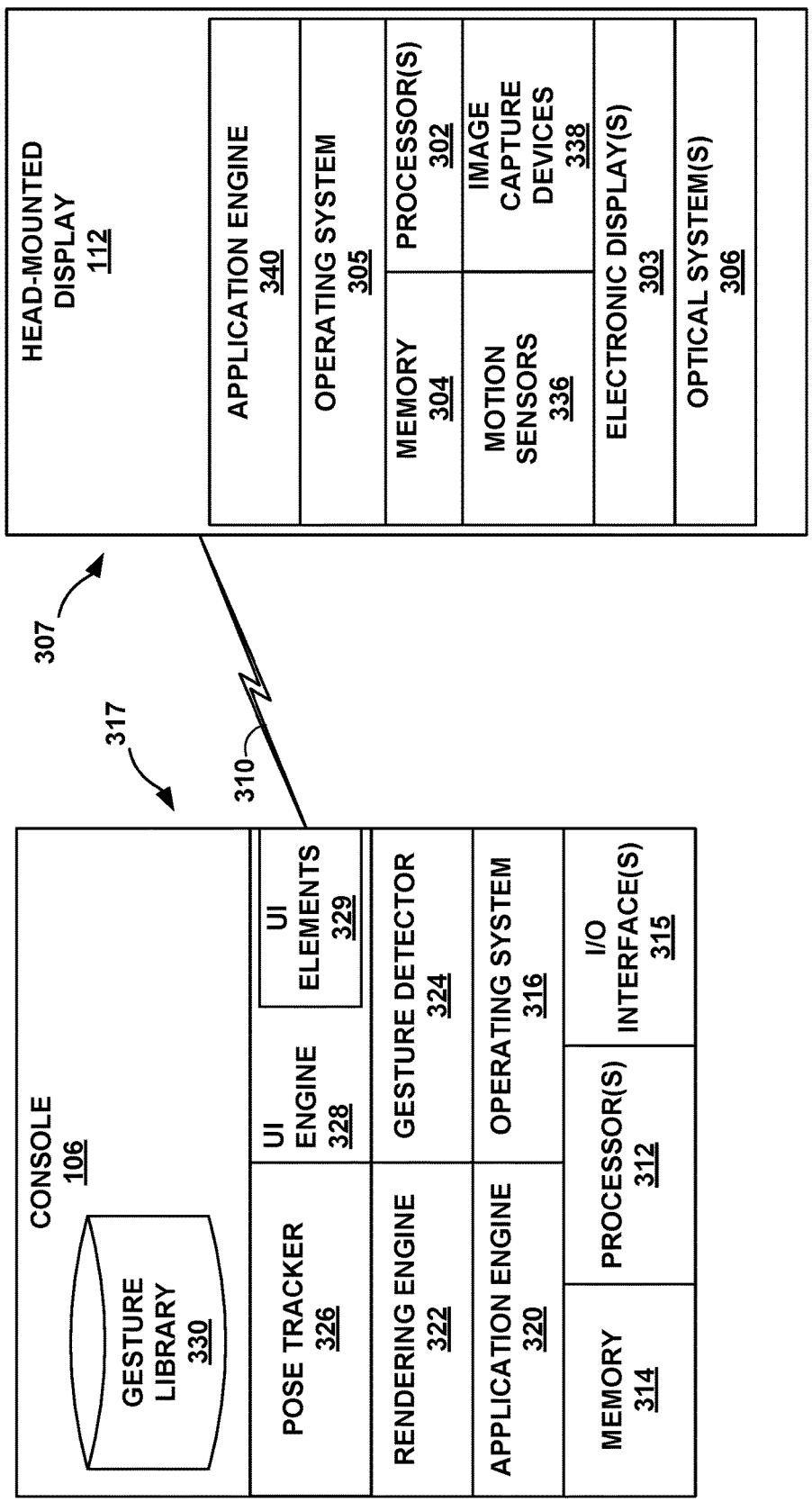
FIG. 3 is a block diagram showing example implementations of a console and an HMD of the artificial reality system of FIG. 1, in accordance with techniques described in this disclosure.

FIG. 3 is a block diagram showing example implementations of a console and an HMD of the artificial reality system of FIG. 1, in accordance with techniques described in this disclosure. In the example of FIG. 3, console 106 performs pose tracking, gesture detection, and user interface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to one or more electronic displays 303, motion sensors 336, image capture devices 338, and, in some examples, optical system 306. Motion sensors 336 of FIG. 3 may be an example of motion sensors 206 of FIGS. 2A and 2B or of sensors 136 of FIG. 1. Image capture devices 338 of FIG. 3 may be an example of image capture devices 238 of FIGS. 2A and 2B or of image capture devices 138 of FIG. 1. In some examples, processors 302 and memory 304 may be separate, discrete components ("off-die memory"). In other examples, memory 304 may be on-die memory collocated with processors 302 within a single integrated circuit such as an SoC. In some examples, functionality of processors 302 and/or memory 304 for processing data may be implemented as an SoC/SRAM integrated circuit component in accordance with the present disclosure. In addition, memories 304 and 314 may include both on-die and off-die memory, with at least portions of the on-die memory being used to cache data stored in the off-die memory. In one such example, SRAM is distributed as local memory between the processors but is accessible to each of the processors via local memory caching, as detailed below.

In some examples, optical system 306 may include projectors and waveguides for presenting virtual content to a user, as described above with respect to FIGS. 2A and 2B. For example, optical system 306 may include a projector including electronic display 303 and a projection lens.

In general, console 106 is a computing device that processes image and tracking information received from image capture devices 338 to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to I/O interfaces 315, which include one or more I/O interfaces for communicating with external devices, such as a keyboard, game controller(s), display device(s), image capture device(s), HMD(s), peripheral device(s), and the like. Moreover, I/O interfaces 315 may include one or more wired or wireless network interface controllers (NICs) for communicating with a network, such as network 104. In some examples, functionality of processors 312 and/or memory 314 for processing data may be implemented as an SoC/SRAM integrated circuit component in accordance with the present disclosure.

Software components 317 of console 106 operate to provide an overall artificial reality application. In this example, software components 317 include application engine 320, rendering engine 322, gesture detector 324, pose tracker 326, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIG. 1), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for HMD 112 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth.

Console 106 may output this virtual user interface and other artificial reality content, via a communication channel 310, to HMD 112 for display at HMD 112.

In one example approach, gesture detector 324 analyzes the tracked motions, configurations, positions, and/or orientations of controller(s) 114 and/or objects (e.g., hands, arms, wrists, fingers, palms, thumbs) of the user to identify one or more gestures performed by user 110, based on the sensed data from any of the image capture devices such as image capture devices 138, 238 or 338, from controller(s) 114, and/or from other sensor devices (such as motion sensors 136, 206 or 336). More specifically, gesture detector 324 analyzes objects recognized within image data captured by motion sensors 336 and image capture devices 338 of HMD 112 and/or sensors 90 to identify controller(s) 114 and/or a hand and/or arm of user 110, and track movements of controller(s) 114, hand, and/or arm relative to HMD 112 to identify gestures performed by user 110. In some examples, gesture detector 324 may track movement, including changes to position and orientation, of controller(s) 114, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of controller(s) 114 and process the user inputs to detect one or more gestures performed by user 110 with respect to controller(s) 114.

As noted above, in some examples, memories 304 and 314 may include on-die and off-die memory. In some such examples, portions of the on-die memory may be used as local memory for on-die compute elements and, occasionally, as cache memory used to cache data stored in other on-die memory or in off-die memory. In accordance with the techniques of the present disclosure, portions of memory 314 may be cached in local memory associated with processors 312 when the local memory is available for caching. Similarly, also in accordance with the techniques of the present disclosure, portions of memory 304 may be cached in local memory associated with processors 302 when the local memory is available for caching.

Figure 4:
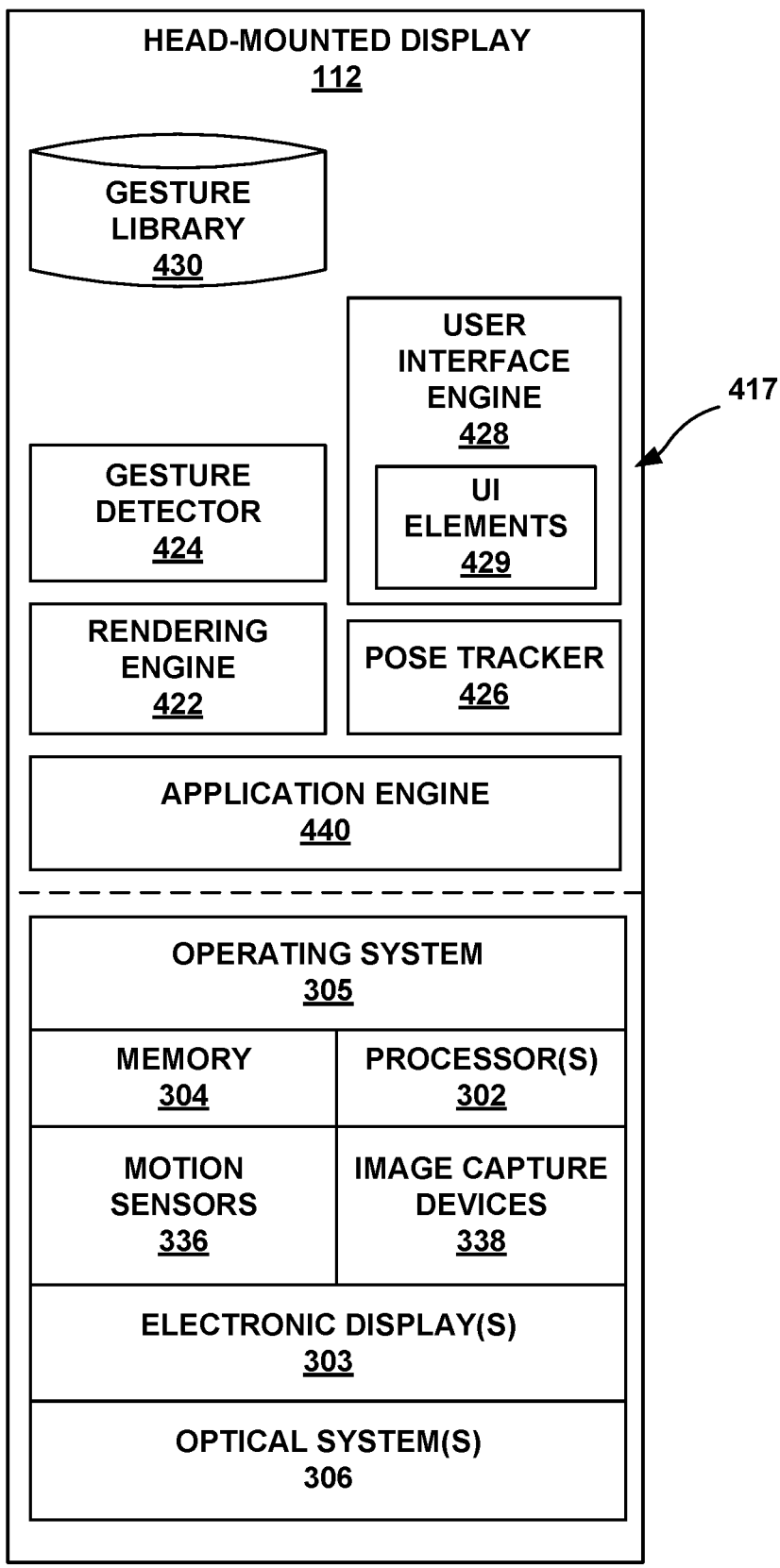
FIG. 4 is a block diagram depicting an example HMD of the artificial reality system of FIG. 1, in accordance with the techniques described in this disclosure.

FIG. 4 is a block diagram depicting one example HMD of the artificial reality system of FIG. 1, in accordance with the techniques described in this disclosure. In the example shown in FIG. 4, HMD 112 is a standalone artificial reality system. In this example, like FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display(s) 303, varifocal optical system(s) 306, motion sensors 336, and image capture devices 338. In some examples, functionality of processors 302 and/or memory 304 for processing data may be implemented as an SoC integrated circuit component in accordance with the present disclosure. In one such example approach, each SoC includes two or more compute elements and memory distributed as local memory among specific compute elements but accessible to each of the other compute elements via a local memory caching mechanism, as detailed below.

In some examples, optical system 306 may include projectors and waveguides for presenting virtual content to a user, as described above with respect to FIGS. 2A and 2B. For example, optical system 306 may include a projector including electronic display 303 and a projection lens. The projection lens may further include a multi-functional DOE that functions as both a grating coupler to redirect light into a waveguide and as a lens element improving the imaging quality of the projector lens.

In the example of FIG. 4, software components 417 operate to provide an overall artificial reality application. In this example, software components 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

As discussed with response to user interface engine 328 of FIG. 3, in one example approach, user interface engine 428 is configured to generate virtual user interfaces for rendering in an artificial reality environment. User interface engine 428 generates a virtual user interface to include one or more virtual user interface elements 429, such as a virtual drawing interface, a selectable menu (e.g., drop-down menu), virtual buttons, a directional pad, a keyboard, or other user-selectable user interface elements, glyphs, display elements, content, user interface controls, and so forth.

As in the console 106 of FIG. 3, in the example HMD 112 of FIG. 4, gesture detector 424 analyzes the tracked motions, configurations, positions, and/or orientations of controller(s) 114 and/or objects (e.g., hands, arms, wrists, fingers, palms, thumbs) of the user to identify one or more gestures performed by user 110, based on the sensed data from any of the image capture devices such as image capture devices 138, 238 or 338, from controller(s) 114, and/or from other sensor devices (such as motion sensors 136, 206 or 336). In some examples, gesture detector 424 may track movement, including changes to position and orientation, of controller (s) 114, hand, digits, and/or arm based on the captured image data, and compare motion vectors of the objects to one or more entries in gesture library 430 to detect a gesture or combination of gestures performed by user 110.

In accordance with the techniques of the present disclosure, memory 304 of FIG. 4 may include both on-die and off-die memory, with at least portions of the on-die memory being used to cache data stored in the off-die memory. In some examples, portions of memory 304 in FIG. 4 may be cached in local memory associated with processors 302 when the local memory is available for caching, as will be discussed in further detail below. Processors 302 may include one or more accelerators.

Figure 5:
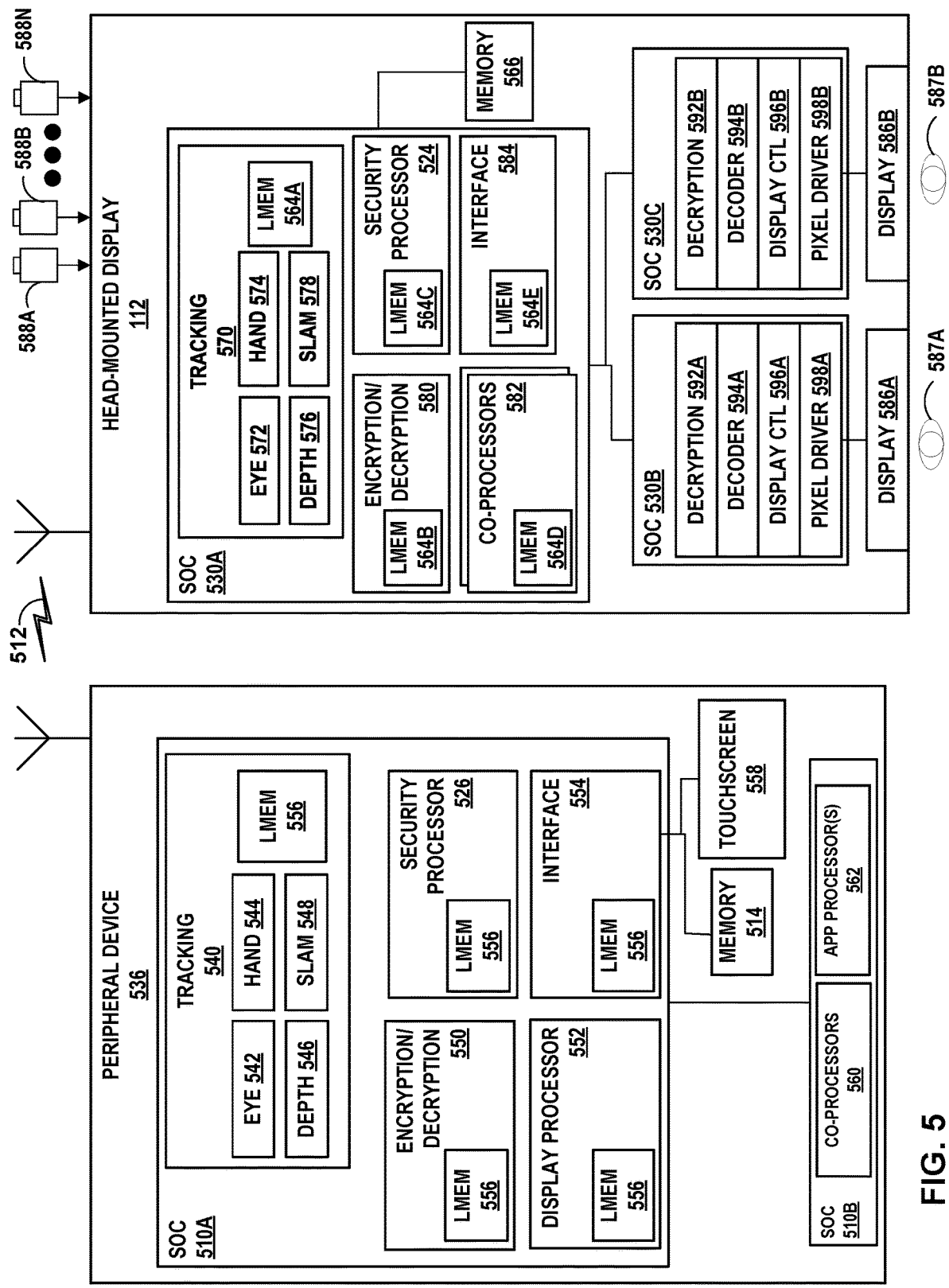
FIG. 5 is a block diagram illustrating an example implementation of a distributed architecture for a multi-device artificial reality system in which one or more devices are implemented using one or more systems-on-a-chip (SoCs) integrated circuits within each device, in accordance with techniques described in this disclosure.

FIG. 5 is a block diagram illustrating an example implementation of a distributed architecture for a multi-device artificial reality system in which one or more devices are implemented using one or more systems-on-a-chip (SoCs) integrated circuits within each device, in accordance with techniques described in this disclosure. FIG. 5 illustrates an example in which HMD 112 operates in conjunction with a peripheral device 536. As described above, HMD 112 is configured to operate with peripheral device 536 to enable the execution of artificial reality applications.

In the example of FIG. 5, peripheral device 536 represents a physical, real-world device having a surface on which multi-device artificial reality systems, such as systems 100, may overlay virtual content. Peripheral device 536 may include an interface 554 having one or more presence-sensitive surface(s) (such as touchscreen 558) for detecting user inputs by detecting a presence of one or more objects (e.g., a finger, a stylus, etc.) touching or hovering over locations of presence-sensitive surfaces. In some examples, peripheral device 536 may have a form factor similar to any of a smartphone, a tablet computer, a personal digital assistant (PDA), or other hand-held device. In other examples, peripheral device 536 may have the form factor of a smartwatch, a so-called "smart ring," or other such wearable device. Peripheral device 536 may also be part of a kiosk, console, or other stationary or mobile system. Interface 554 may incorporate output components, such as touchscreen(s) 558, for outputting touch locations or other visual content to a screen. However, not all examples of peripheral device 536 include a display.

In the example of FIG. 5, HMD 112 and peripheral device 536 include SoCs 530A-530C and 510A-510B, respectively. SOCs 530A and 510A represent a collection of specialized integrated circuits arranged in a distributed architecture and configured to provide an operating environment for artificial reality applications. As examples, SoC integrated circuits may include a variety of compute elements. The compute elements may include specialized functional blocks operating as co-application processors, sensor aggregators, encryption/decryption engines, security processors, hand/eye/depth tracking and pose computation elements, video encoding and rendering engines, display controllers and communication control components. Some or all of these functional blocks may be implemented as subsystems that include local memory such as LMEM 556 or 564. In one example approach, each SoC (510A, 510B, and 530A-530C) in FIG. 5 includes two or more compute elements and memory distributed as local memory among specific compute elements but accessible to each of the other compute elements via a local memory caching mechanism, as detailed below. FIG. 5 is merely one example arrangement of SoC integrated circuits. The distributed architecture for a multi-device artificial reality system may include any collection and/or arrangement of SoC integrated circuits.

In the example of FIG. 5, HMD 112 includes SoCs 530A, 530B and 530C in accordance with the techniques of the present disclosure. In the example shown, SoC 530A includes local memories LMEM 564A-564E (collectively, "LMEM 564"), in some examples SRAM but other types of memory may be used. In some example approaches, LMEM 564 may be separated or external (e.g., not on-die) from the processor(s) and other on-die circuitry of SoC 530A. Peripheral device 536, in this example, is implemented using a traditional SoC architecture, in which SoC 510A includes an on-die LMEM 556 that may be distributed across subsystems of SoC 510A, and external (off-die) memory 514, which may include volatile and/or non-volatile memory. In contrast, HMD 112 includes a memory 566, which may include volatile and/or non-volatile memory. In accordance with the techniques of the present disclosure, portions of memory 566 may be cached in LMEM 564 when the various LMEM 564 are available for caching. Similarly, also in accordance with the techniques of the present disclosure, portions of memory 514 may be cached in LMEM 556 when the various LMEM 556 are available for caching.

Head-mounted displays, such as the HMD 112 described herein, benefit from the reduction in size, increased processing speed and reduced power consumption provided by using on-chip memory such as LMEM 564 in SoC 530A. For example, the benefits provided by the SoC 530A in accordance with the techniques of the present disclosure may result in increased comfort for the wearer and a more fully immersive and realistic AR/VR experience.

In addition, it shall be understood that any of SoCs 510 and/or 530 may be implemented using an SoC with integrated memory in accordance with the techniques of the present disclosure, and that the disclosure is not limited in this respect. Any of the SoCs 510 and/or 530 may benefit from the reduced size, increased processing speed and reduced power consumption provided by the SoC/SRAM integrated circuit described herein. In addition, the benefits provided by the SoC/SRAM component in accordance with the techniques of the present disclosure are not only advantageous for AR/VR systems, but may also be advantageous in many applications such as autonomous driving, edge-based artificial intelligence, the Internet-of-Things (IoT), and other applications which require highly responsive, real-time decision-making capabilities based on analysis of data from a large number of sensor inputs.

In the example of FIG. 5, SoC 530A of HMD 112 comprises functional blocks including security processor 524, tracking 570, an encryption/decryption 580, co-processors 582, and an interface 584. Tracking 570 provides a functional block for eye tracking 572 ("eye 572"), hand tracking 574 ("hand 574"), depth tracking 576 ("depth 576"), and/or Simultaneous Localization and Mapping (SLAM) 578 ("SLAM 578"). Some or all these functional blocks may be implemented within one or more subsystems of SoC 530A. As an example of the operation of these functional blocks, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices 588 may include video cameras, laser scanners, Doppler radar scanners, depth scanners, or the like, configured to output image data representative of the physical environment. More specifically, image capture devices 588 capture image data representative of objects (including peripheral device 536 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Encryption/decryption 580 of SoC 530A is a functional block to encrypt outgoing data communicated to peripheral device 536 or to a security server and decrypt incoming data communicated from peripheral device 536 or from a security server. Coprocessors 582 include one or more processors for executing instructions, such as a video processing unit, graphics processing unit, digital signal processors, encoders and/or decoders, and applications such as AR/VR applications.

Interface 584 of SoC 530A is a functional block that includes one or more interfaces for connecting to memory 514, touchscreen 558 and functional blocks of SoC 530B and/or 530C. As one example, interface 584 may include peripheral component interconnect express (PCIe) slots. SoC 530A may connect with SoC 530B and 530C using interface 584. SoC 530A may also connect with a communication device (e.g., radio transmitter) using interface 584 for communicating via communications channel 512 with other devices, e.g., peripheral device 536.

SoCs 530B and 530C of HMD 112 each represents display controllers for outputting artificial reality content on respective displays, e.g., displays 586A, 586B (collectively, "displays 586"). In this example, SoC 530B may include a display controller for display 586A to output artificial reality content for a left eye 587A of a user. As shown in FIG. 5, SoC 530B may include a decryption block 592A, decoder block 594A, display controller 596A, and/or a pixel driver 598A for outputting artificial reality content on display 586A. Similarly, SoC 530C may include a display controller for display 586B to output artificial reality content for a right eye 587B of the user. As shown in FIG. 5, SoC 530C may include decryption 592B, decoder 594B, display controller 596B, and/or a pixel driver 598B for generating and outputting artificial reality content on display 586B. Displays 568 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

As shown in FIG. 5, peripheral device 536 may include SoCs 510A and 510B configured to support an artificial reality application. In this example, SoC 510A comprises functional blocks including security processor 526, tracking 540, encryption/decryption 550, display processor 552, and interface 554. Tracking 540 is a functional block providing eye tracking 542 ("eye 542"), hand tracking 544 ("hand 544"), depth tracking 546 ("depth 546"), and/or Simultaneous Localization and Mapping (SLAM) 548 ("SLAM 548"). Some or all of these functional blocks may be implemented in various subsystems of SoC 510A. As an example of the operation of SoC 510A, peripheral device 536 may receive input from one or more accelerometers (also referred to as inertial measurement units or "IMUs") that output data indicative of current acceleration of peripheral device 536, GPS sensors that output data indicative of a location of peripheral device 536, radar or sonar that output data indicative of distances of peripheral device 536 from various objects, or other sensors that provide indications of a location or orientation of peripheral device 536 or other objects within a physical environment. Peripheral device 536 may in some examples also receive image data from one or more image capture devices, such as video cameras, laser scanners, Doppler radar scanners, depth scanners, or the like, configured to output image data representative of the physical environment. Based on the sensed data and/or image data, tracking block 540 determines, for example, a current pose for the frame of reference of peripheral device 536 and, in accordance with the current pose, renders the artificial reality content to HMD 112.

In another example approach, tracking block 570 determines the current pose based on the sensed data and/or image data for the frame of reference of peripheral device 536 and, in accordance with the current pose, renders the artificial reality content relative to the pose for display by HMD 112.

Encryption/decryption 550 of SoC 510A encrypts outgoing data communicated to HMD 112 or security server and decrypts incoming data communicated from HMD 112 or security server. Encryption/decryption 550 may support symmetric key cryptography to encrypt/decrypt data using a session key (e.g., secret symmetric key). Display processor 552 of SoC 510A includes one or more processors such as a video processing unit, graphics processing unit, encoders and/or decoders, and/or others, for rendering artificial reality content to HMD 112. Interface 554 of SoC 510A includes one or more interfaces for connecting to functional blocks of SoC 510A. As one example, interface 584 may include peripheral component interconnect express (PCIe) slots. SoC 510A may connect with SoC 510B using interface 584. SoC 510A may connect with one or more communication devices (e.g., radio transmitter) using interface 584 for communicating with other devices, e.g., HMD 112.

SoC 510B of peripheral device 536 includes co-application processors 560 and application processors 562. In this example, co-processors 560 include various processors, such as a vision processing unit (VPU), a graphics processing unit (GPU), and/or central processing unit (CPU). Application processors 562 may execute one or more artificial reality applications to, for instance, generate and render artificial reality content and/or to detect and interpret gestures performed by a user with respect to peripheral device 536. In one example approach, both co-processors 560 and application processors 562 include on-chip memory (such as LMEM 556). As noted above, in accordance with the techniques of the present disclosure, portions of memory 514 may be cached in LMEM 556 when the various LMEM 556 are available for caching.

Figure 6:
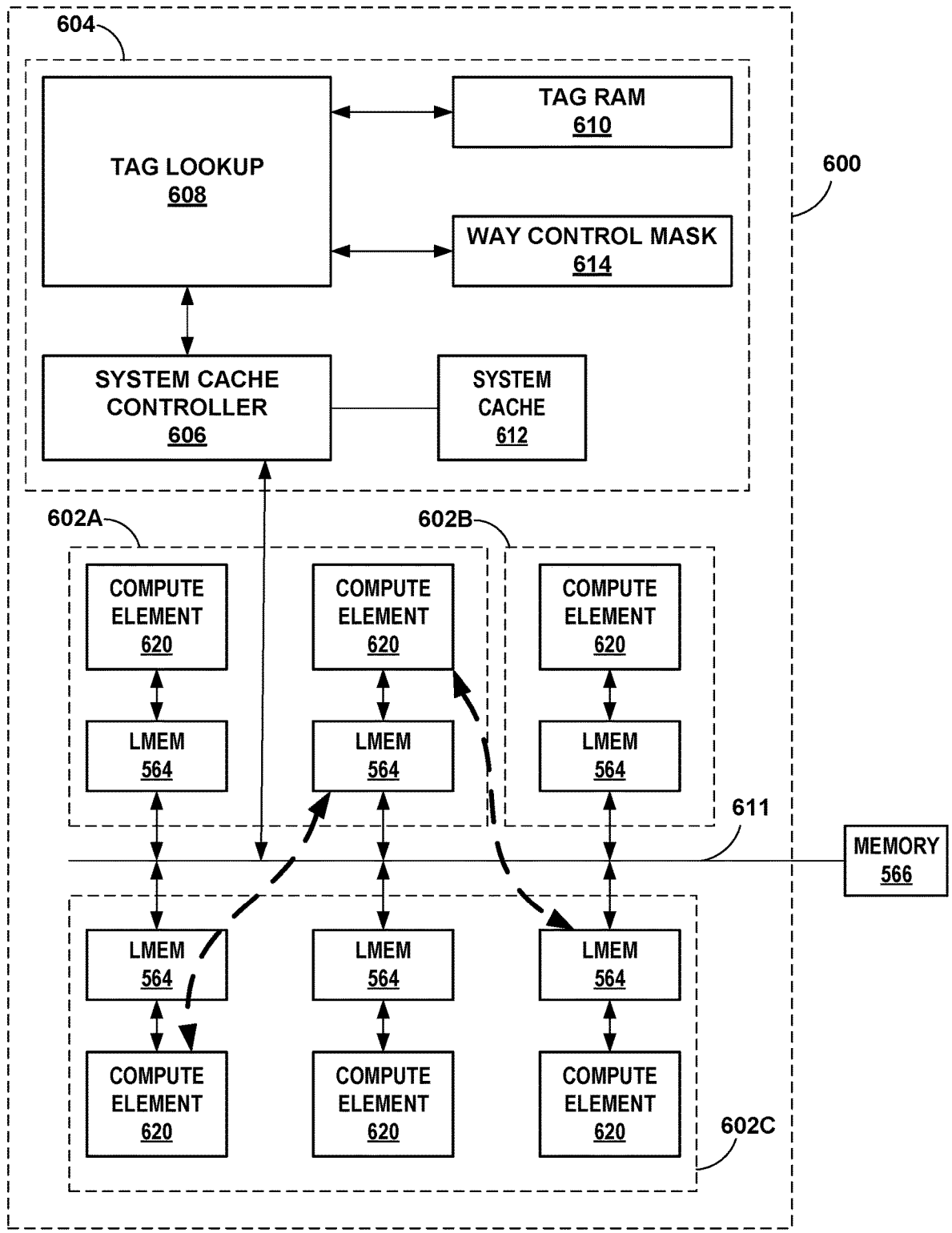
FIG. 6 is a block diagram illustrating an example cache in a distributed memory system, in accordance with techniques described in this disclosure.

FIG. 6 is a block diagram illustrating an example cache in a distributed memory system, in accordance with techniques described in this disclosure. The example shown in FIG. 6 illustrates a System on Chip (SoC) 600 having three subsystems 602A-602C (collectively "subsystems 602") and a distributed cache controller 604. In the example shown, distributed cache controller 604 includes a system cache controller 606, a centralized TAG lookup 608, a TAG RAM 610 and a way control mask 614; the cache memory is distributed among local memory 564 in the subsystems 602 of SoC 600. In the example shown, a compute element 620 is connected to local memory 564 and has access via distributed cache controller 604 to cache memory blocks stored in local memory 564 of other compute elements 620. Subsystems 602, cache controller 604, and memory 566 may be connected via a Network-on-Chip (NoC) 611. Cache controller 604 may control access to LMEMs 564 from outside of the subsystems 602.

In one example approach, distributed cache controller 604 is an N-way set-associative cache. In a set-associative cache, there are a fixed number of locations where each block to be cached may be stored. That fixed number of locations are elements in a set; an N-way set-associative cache includes a number of such sets, each of which includes N locations for storing data blocks. Each block in the memory maps to a unique set in the cache given by the index field. A block (cache line) may be placed in any location in the set. To access a cache line, all blocks in the set corresponding to the cache line are searched for a match. That is, in the example shown in FIG. 6, the Tag RAM 610 associated with the set is searched across multiple ways. If a match is found at one of the locations in the set, the data has been cached and may be accessed by a compute element 620.

In one example approach, the M most significant bits of an address form the tag, while the next S bits select the set associated with the address. The least significant bits of the address select data from within the block. Such an approach takes advantage of the principle of spatial locality in memory requests. Other combinations of nonoverlapping address bits may also be used for the tag, set and block address bits.

In one example approach, sets of cache locations are allocated to particular sections of local memory 564, with all locations in the set placed in a single local memory 564. The different sets may, however, be distributed across two or more local memories 564. Tags and indices associated with cached blocks of data are stored in tag RAM 610.

In operation, in a read operation, a read request is received by system cache controller 606. The system cache controller 606 sends the set number and tag of the address of the read request to tag lookup 608, which accesses tag RAM 610 to determine if the block associated with the address is in cache. If so, tag lookup 608 returns a cache hit, and the location in the set where the cache line is stored. The read request is then fulfilled from the cache distributed between system cache 612 and one or more LMEM 564. That is, the read request is fulfilled from either the main system cache 612 or from one of the local memories 564 in the different compute units 602.

If, however, the block associated with the read request is not in cache, tag lookup 608 signals a cache miss and the read request is sent to memory 566 for fulfillment. A read miss brings back a cache line, fulfils the read request, and stores the cache line in a local memory 564 in one of the locations in the set associated with the read request address. In one example approach, the location selected from the set of locations is selected randomly. In another example approach, the location selected from the set of locations is the location that has not been accessed for the longest time. Other replacement algorithms may be used as needed.

In one example approach, each cache line has attributes that indicate whether the cache line has been modified (dirty cache line bits). In one such example approach, the dirty bits are stored with the tag in tag RAM 610. When a cache line is replaced, only cache lines with dirty bits are written back to memory 566. As an example, assume that an entire data section is resident in the cache as a set of cache lines. Instead of having to copy the entire data section to memory, only the dirty cache lines are copied to memory 566 on a transition.

As shown in FIG. 6, distributed cache controller 604 includes a system cache 612 used to store cache lines separate of local memories 564. In one such approach, cache controller 606 determines whether a particular way or set is located in the main system cache 612 or in the local memory 564 in one of the subsystems 602. In one example approach, cache controller 606 accesses the tag lookup 608 as usual and, if the data corresponding to the address has been cached, then cache controller 606 determines if the cache line is located in the main system cache 612 or in the local memory 564 in one of the subsystems 602 and proceeds accordingly.

In one example approach, the SoC 600 of FIG. 6 includes a plurality of local memories, including a first local memory (e.g., LMEM 564 of subsystem 602A) and a second local memory (e.g., LMEM 564 of subsystem 602B). SoC 600 also includes a first subsystem (602A) comprising a first compute element (620 of subsystem 602A) and the first local memory, the first compute element connected to the first local memory; a second subsystem (602B) comprising a second compute element (620 of subsystem 602B) and the second local memory, the second compute element connected to the second local memory; and an N-way set associative cache controller (cache controller 604), the set associative cache controller controlling an N-way set associative cache having a plurality of sets, wherein each location in a cacheable memory accessible to the SoC is mapped to one of the sets, wherein each set includes N locations for caching data blocks read from the cacheable memory, wherein N is an integer greater than one. In one example approach, each set is mapped to one of the plurality of local memories and the set associative cache controller is configured to receive a read request having an address, to identify a data block in the cacheable memory associated with the address, to determine if the identified data block is in cache in one of the plurality of local memories, and, if the identified data block is in cache in one of the plurality of local memories, to fetch the identified data block from the cache. If the identified data block is not in cache in one of the plurality of local memories, the set associative cache controller is further configured to fetch the identified data block from the cacheable memory.

When the first compute element is executing an application in the first local memory, the set associative cache is further configured to disable from caching sets of the cache mapped to the first local memory, and, when the second compute element is executing an application in the second local memory, the set associative cache is further configured to disable from caching sets of the cache mapped to the second local memory.

As noted above, it may be advantageous to use a local memory 564 to store cache lines when the local memory is not being used by the local compute elements 620. As noted above, there is, for example, a temporal nature to local memory use when executing certain applications. The temporal nature of such use may be used to gain additional storage for cache lines in times when the memory is not being used.

In one example approach, sets of cache locations are assigned to particular local memories 564 and are only available for caching when the local memory 564 associated with the set is available for caching. In one such example approach, way control mask 614 includes an entry for each set which indicates whether that particular set is available for caching.

Figure 7A:
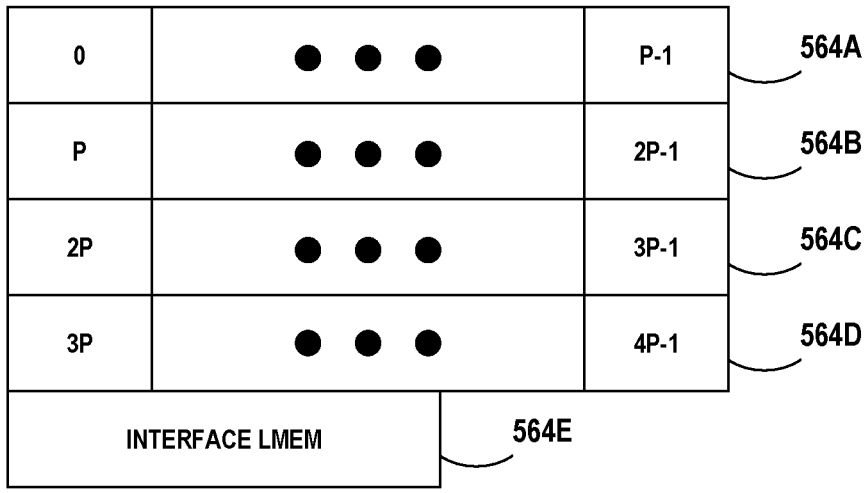
FIGS. 7A and 7B illustrate example distributions of sets of locations between local memories 564 of FIG. 5, in accordance with techniques described in this disclosure.
Figure 7B:
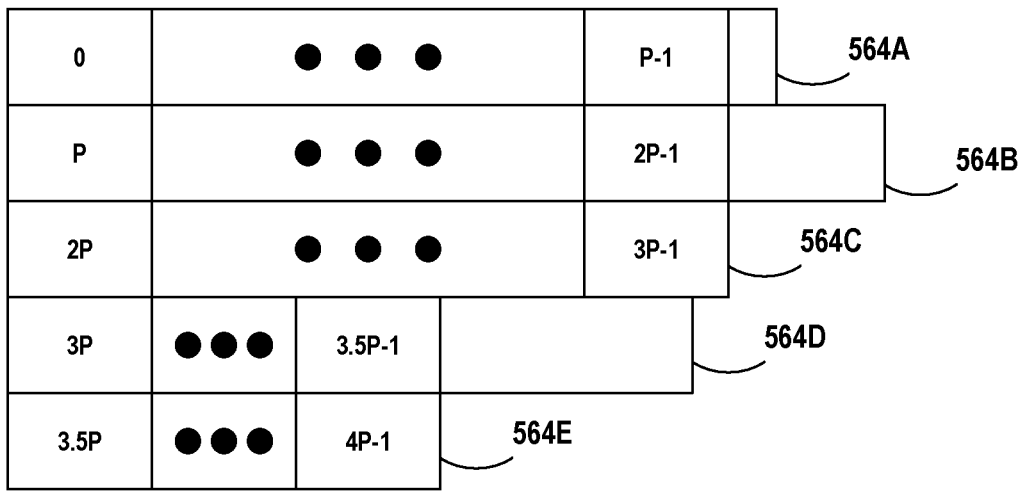

FIGS. 7A and 7B illustrate example distributions of sets of locations between local memories 564 of FIG. 5, in accordance with techniques described in this disclosure. In one example approach, sets of cache locations are assigned to particular local memories 564 and are only available for caching when the local memory 564 associated with the set is available for caching. As illustrated in FIG. 7A, in one example, sets 0-(P-1) are allocated to the LMEM 564A of tracking 570, sets P-(2P-1) are allocated to the LMEM 564B of encryption/decryption 580, sets 2P-(3P-1) are allocated to the LMEM 564C of security processor 524, and sets 3P-(4P-1) are allocated to the LMEM 564D of coprocessor 582.

The number of sets stored in each LMEM 564 may not be the same across all LMEM 564. For instance, as shown in FIG. 7B, local memory 564 may not be of uniform size, or sets may be allocated nonuniformly across the various LMEM 564. Similarly, the data width of each LMEM 564 may not be the same, and there may be a need to pack and unpack the data of the cache lines to use certain LMEM 564 more efficiently. In addition, system cache controller 606 may allocate sets of locations dynamically as space in a particular LMEM 564 becomes available, or may move sets between LMEM 564 as needed.

In the example illustrated in FIG. 7B, LMEM 564D and 564E are smaller than 564A-C, limiting the number of sets that can be stored in them. As shown in FIG. 7B, the cache memory of LMEM 564A, 564B and 564D only partially fill local memory, while the cache memory of LMEM 564C and 564E fill local memory. In one such example, sets 0-(P-1) are allocated to the LMEM 564A of tracking 570, sets P-(2P-1) are allocated to the LMEM 564B of encryption/decryption 580, sets 2P-(3P-1) are allocated to the LMEM 564C of one of the security processor 524, and sets 3P-(3.5P-1) are allocated to the LMEM 564D of coprocessor 582, and sets 3.5P-(4P-1) are allocated to the LMEM 564E of interface 584. In one example approach, way control mask 614 of FIG. 6 includes an entry for each of sets 2P-(3P-1) to indicate when the sets are available for caching (e.g., when security processor 524 is using its local memory 564).

In one example approach, sets of cache locations are assigned dynamically as space opens on particular local memories 564. For instance, in the example from FIG. 7A, sets 2P-(3P-1) may be moved from the LMEM 564C of security processor 524 to the LMEM 564E of interface 584 if security processor 524 becomes active and the local memory 564E of interface 584 is available.

Returning to the discussion of FIG. 6, in one example approach, sets of cache locations are assigned to particular local memories 564 and are available for caching when the local memory 564 associated with the set is available for caching. In one such example approach, way control mask 614 of FIG. 7 includes an entry for each set used to indicate whether that particular set is available for caching.

Figure 8:
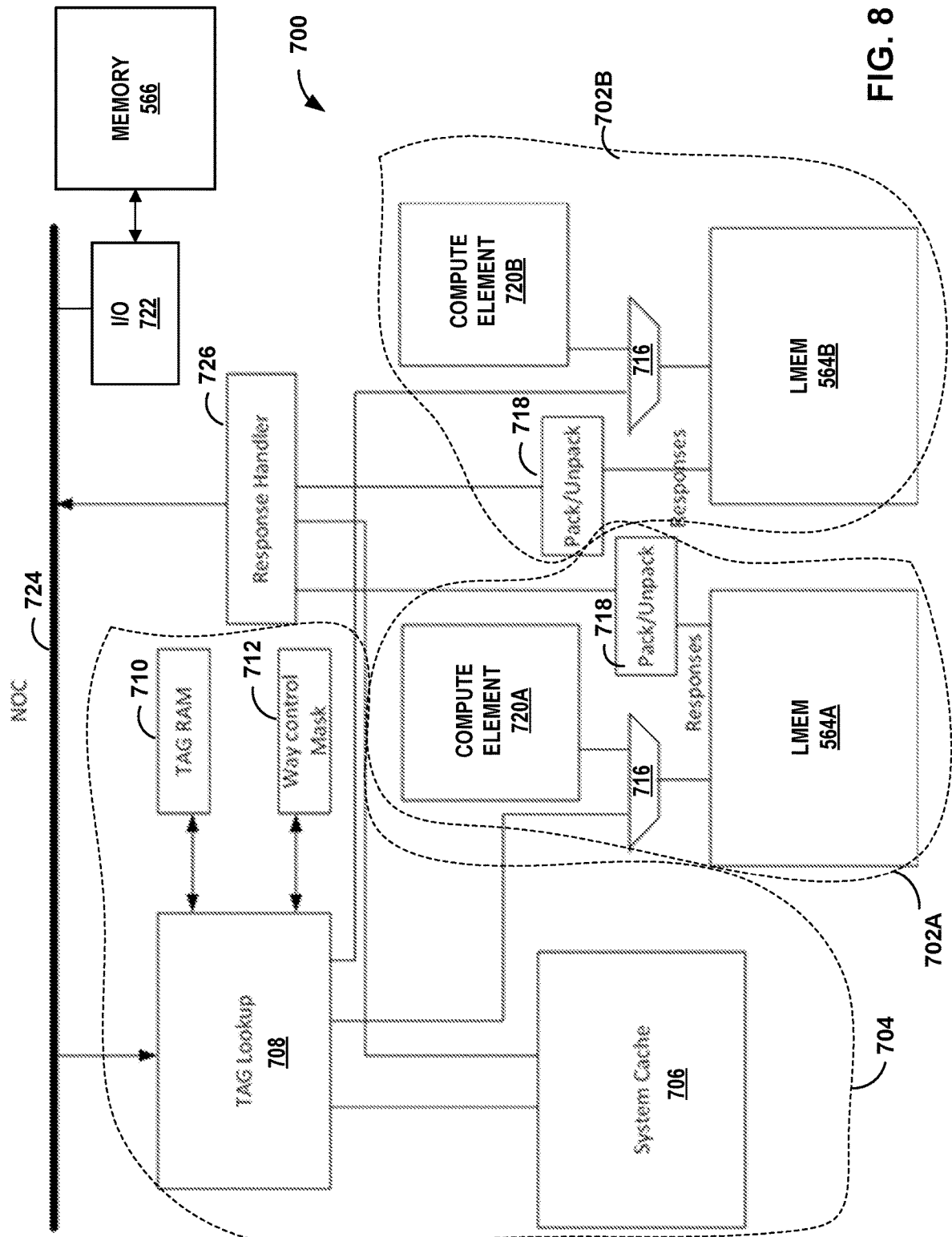
FIG. 8 is a block diagram illustrating another example of a cache in a distributed memory system, in accordance with techniques described in this disclosure.

FIG. 8 is a block diagram illustrating another example of a cache in a distributed memory system, in accordance with techniques described in this disclosure. The example shown in FIG. 8 illustrates a System on Chip (SoC) 700 having two subsystems 702A and 702B (collectively "subsystems 702") and a distributed cache controller 704. In the example shown, distributed cache controller 704 includes a system cache controller 706, a centralized TAG lookup 708, a TAG RAM 710 and a way control mask 714; the cache memory is distributed among local memory 564 in the subsystems 702 of SoC 700. In the example shown, a compute element 720A is connected to local memory 564A and has access via distributed cache controller 704 to cache blocks stored in local memories 564 (such as local memory 564B) while a compute element 720B is connected to local memory 564B and has access via distributed cache controller 704 to cache blocks stored in local memory 564A. In one example approach, distributed cache controller 704 is an N-way set-associative cache. In one such example approach, the different sets of the cache may be distributed across two or more local memories 564. Tags and indices associated with cached blocks of data are stored in tag RAM 710.

In operation, in a read operation, a read request is received by system cache controller 606. The system cache controller 706 sends the set number and tag of the address of the read request to tag lookup 708, which accesses tag RAM 710 to determine if the block associated with the address is in cache. If so, tag lookup 708 returns a cache hit, and the location in the set where the cache line is stored. The read request is then fulfilled from the cache line.

If, however, the block associated with the read request is not in cache, tag lookup 708 signals a cache miss and the read request is sent via input/output 722 to off-die memory 566 for fulfillment. A read miss brings back a cache line, fulfils the read request, and stores the cache line in a local memory 564 in one of the locations in the set associated with the read request address. In one example approach, the location selected from the set of locations is selected randomly. In another example approach, the location selected from the set of locations is the location that has not been accessed for the longest time. Other replacement algorithms may be used as needed.

In one example approach, each cache line has attributes that indicate whether the cache line has been modified (dirty cache line bits). In one such example approach, the dirty bits are stored with the tag in tag RAM 710. When a cache line is replaced, only cache lines with dirty bits are written back to memory 566. As an example, assume that an entire data section is resident in the cache as a set of cache lines. Instead of having to copy the entire data section to memory, only the dirty cache lines are copied to memory 566 on a transition.

In one example approach, distributed cache controller 704 includes a main system cache (not shown) used to store cache lines independently of local memories 564. In one such approach, cache controller 706 determines whether a particular way or set is located in the main system cache or in the local memory 564 in one of the subsystems 702. In one example approach, cache controller 706 accesses the tag lookup 708 as usual and, if the data corresponding to the address has been cached, then cache controller 706 determines if the cache line is located in the main system cache or in the local memory 564 in one of the subsystems 702 and proceeds accordingly.

In the example approach shown in FIG. 8, multiplexers 716 multiplex the memory address and data received from cache controller 704 and the memory address and data received from accelerators 720A and 720B in order to present to local memory 564 the appropriate address and data for the source of the read or write request. In one example approach, multiplexers 716 select between the address and data bus of local compute element 720 (such as the accelerators located in the subsystems 702) that need to access the memory 564 when elements 720 are operational and the address and data bus from the cache controller.

It should be noted that local memories 564 may come in different sizes and shapes. In one example, the data width and size of each local memory 564 may be dictated by the needs of the accelerators 720; these are not typically the dimensions of a cache line. In many cases the buses used by a compute element 710 to access a local memory 564 may be very wide due to the need for bandwidth. In addition, a given local memory 564 may include multiple memories of different shapes and sizes instead of one monolithic local memory. In one example approach, packing/unpacking logic 718 is used to translate data received from a local memory into a word or group of words sent in response to a read request and to translate words or groups of words into a format consistent with writing data into the recipient local memory 564.

In one example approach, SoC 700 includes a Network-on-a-Chip (NOC) 724. In one example, NOC 724 is a network-based communications system that implements a router-based packet switching network on-die between subsystems 702. In a typical cache there is a fixed latency as the cache memory is co-located with the cache controller. This is not the case with the distributed approach of FIG. 8 as the latency varies depending on the location of the physical cache memory. A system cache 712 may have the same deterministic latency as before but the other caches will have a variable latency. The different subsystems 702 may each have different latencies and it is also possible that the different local memories 564 in a subsystem 702 could have different latencies depending on their organization. It is further possible that, based on the data width of the local memory SRAM and cache data line size, different accesses may result in different latencies. Due to the different latencies, in one example approach, distributed cache controller 704 supports a Request/Response paradigm. In one such example approach, cache controller 704 determines where a cache line exists in the SoC and then makes a request to the cache memory of the appropriate subsystem 702 (including its own subsystem) to either fetch or write to the "cache memory." In one example approach, a read request that hits in tag RAM 710 causes system cache controller 706 to pass the location of the cache line to the appropriate subsystem 702 and from there to the appropriate local memory 564. The response is then sent through the response handler 726 to the initiator. In one such example approach, there is a full handshake between the system cache controller 706 and response handler 726.

In another such example approach, there is a full handshake between the system cache controller 706 and a cache memory controller (not shown) associated with the local memory where the cache line is stored. Due to the variable latencies, however, the cache accesses are no longer strongly ordered; the responses may come back in any order. As a consequence, any initiator that needs its requests to be ordered will require a reorder buffer. Another complication is that there are a number of data hazards may require handling; complex Content addressable memories (CAM or CAM like structures) may be needed to handle these hazards.

Figure 9:
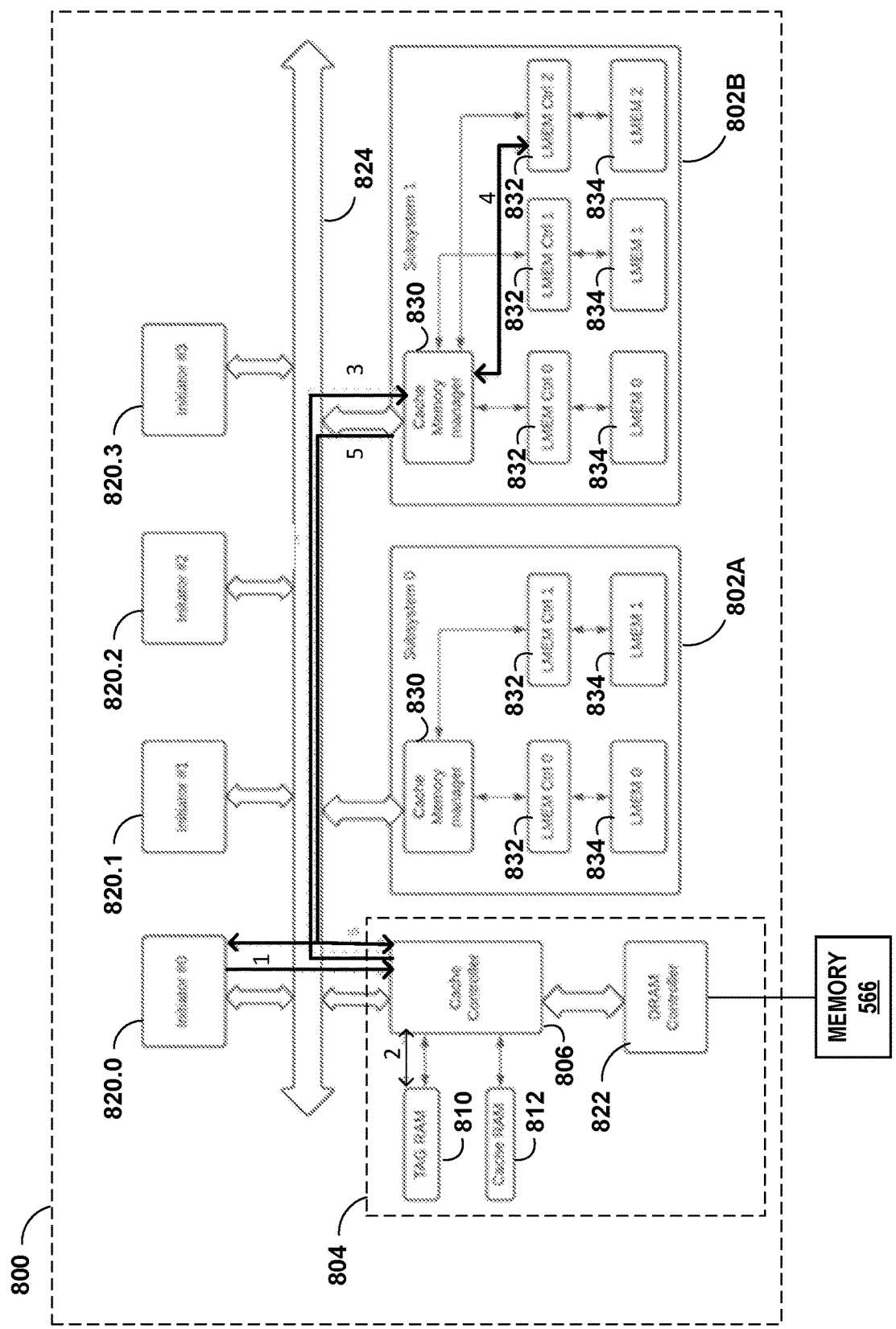
FIG. 9 illustrates another mechanism for handling variable latency in cache accesses, in accordance with techniques described in this disclosure.

FIG. 9 illustrates another mechanism for handling variable latency in cache accesses, in accordance with techniques described in this disclosure. In the example approach of FIG. 9, a System on Chip (SoC) 800 includes four initiators 820.0-820.3 (collectively, "initiators 820") connected via a NOC 824 to a distributed cache controller 804 and two memory subsystems 802A and 802B. In the example shown, distributed cache controller 804 includes a system cache controller 806, a TAG RAM 810 and a system cache 812; the cache memory is also distributed among local memory 834 in the subsystems 802 of SoC 800. In one example approach, system cache controller 806 includes a TAG lookup that operates with tag RAM 810 to determine if a cache line is in local memory 834.

One issue with the example approach described with respect to FIG. 8 is the previous embodiment is the number of wires running around the SOC 700. The local memories 564 are distributed across the SoC 700 and, in order to build a distributed cache, SoC 700 has wire running from a central system cache controller 706 to these memories 564. This approach causes a routing and congestion problem. As noted above in the discussion of FIG. 8, one way to solve this problem is to use the paradigm "Route packets and not wires" and use a Network on Chip (NoC) 824 to interface the system cache controller 806 with the cache memory controller 830. This approach eliminates wires, eliminates congestion and allows for easier routing.

In contrast to the example approaches of FIGS. 6 and 8, in the example cache of FIG. 9, each subsystem includes a cache and LMEM controller ("cache memory controller 830") connected through a local memory controller 834 to local memory 834. Cache memory controller 830 provides seamless access to the initiator/accelerators 820 and to the cache controller 806 via NOC 824. In one exemplary case there is a cache memory controller 830 associated with each local memory structure 834. In other words, a subsystem 802 may have multiple cache memory controllers 830. Since the data width may not fit nicely into a cache line, local memory controller 832 may require packing/unpacking logic.

In another example approach, local memory configuration is further decentralized. That is, in one such example approach, each subsystem cache memory manager 830 determines the size of the memory that is available to be cached and communicates this information to system cache controller 806. In a case where the portion of the cache (way of the cache) needs to be taken back and reassigned as local memory then an IPC is sent to the system cache memory manager, and it would need to tell the system cache controller that the ways associated with that local memory needs to be flushed before it can be repurposed as local memory for an accelerator. Since the memory is distributed the flush would translate to a read by the system cache controller followed by a write to DDR. In other embodiments, the NoC 824 can be used to generate a flush command which would essentially perform the transaction of read and write without the system cache intervention (i.e., the NoC will send a flush command with the DDR address to a memory controller, and it would read the contents of the local memory and then initiate a write to DDR). The size of the cache in a subsystem may be limited to be a multiple of the size of the way (i.e., each subsystem provides 0 . . . N (where N∈Z) additional ways to the system cache).

In one example approach, distributed cache controller 804 supports a Request/Response paradigm. In one such example approach, distributed cache controller 804 determines where a cache line exists in the SoC 800 and then makes a request to the local memory 834 of the appropriate subsystem 802 (including its own subsystem) to either fetch or write to the "cache memory." In one such example approach, system cache controller 806 makes a request to the cache memory controller 830 of the appropriate subsystem 802 when it needs to read data from a cache line and makes a request from input/output 822 when it needs to fetch a cache line from off-chip memory 566. In one such example approach, there is a full handshake between the system cache controller 806 and a cache memory controller 830 associated with the local memory 834 where the cache line is stored. Due to the variable latencies, however, the cache accesses are no longer strongly ordered. That is, the responses may come back in any order. As a consequence, any initiator 820 that needs its requests to be ordered may require a reorder buffer. Another complication is that there are a number of data hazards may require handling; complex Content addressable memories (CAM) are one possible way be needed to handle these hazards.

In the example shown in FIG. 9, an initiator 820 may be given sole access to a local memory 834 (such as a local memory 834 in subsystem 802A) and may be given access via distributed cache controller 804 to cache blocks stored in other local memories 834 (such as a local memory 834 in subsystem 802B). In one example approach, distributed cache controller 804 is an N-way set-associative cache. In one such example approach, the different sets of the cache may be distributed across two or more local memories 834. Tags and indices associated with cached blocks of data are stored in tag RAM 810 in the manner described above.

As shown in FIG. 9, in operation, in a read operation, an initiator (Initiator #0) issues a read request (1). System cache controller 806 receives the read request and sends the set number and tag of the address of the read request to a tag lookup in system cache controller 806, which accesses TAG RAM 810 to determine if the block associated with the address is in cache (2). If so, the tag lookup returns a cache hit, and the location in the set where the cache line is stored. The read request is then fulfilled from the cache line.

In one example approach, as shown in FIG. 9, on a cache hit, system cache controller 806 issues a read request to cache memory manager 830 of subsystem 802B requesting that cache memory manager 830 fetch data from the cache line associated with the read request (3). Cache memory manager 830 forwards the request to the appropriate local memory controller 832, which in turn, fetches the data from the appropriate cache line and forwards the data to cache memory manager 830 (4). Cache memory controller returns the data to Initiator #0 to complete the request and to system cache controller 806 to terminate the request in system cache controller 806 (5).

If, however, the block associated with the read request is not in cache, the tag lookup signals a cache miss and the read request is sent via input/output 822 (such as a DRAM controller) to off-die memory 566 for fulfillment. A read miss brings back a cache line, fulfils the read request, and stores the cache line in a local memory 834 in one of the locations in the set associated with the read request address. In one example approach, the location selected from the set of locations is selected randomly. In another example approach, the location selected from the set of locations is the location that has not been accessed for the longest time. Other replacement algorithms may be used as needed.

In one example approach, each cache line has attributes that indicate whether the cache line has been modified (dirty cache line bits). In one such example approach, the dirty bits are stored with the tag in tag RAM 810. When a cache line is replaced, only cache lines with dirty bits are written back to memory 566. As an example, assume that an entire data section is resident in the cache as a set of cache lines. Instead of having to copy the entire data section to memory, only the dirty cache lines are copied to memory 566 on a transition.

In some example approaches, cache lines are distributed across one or more local memories 834 within subsystem 802. In another example embodiment the cache memory manager 830 in each subsystem 802 may be responsible for managing all the cache transactions. It will partition the available subsystem local memories and interface with the cache controller 806. It will act as a go between for the cache controller 806 and local memory controllers 832. In this scenario the local memory controller 832 may only be responsible for providing access to the accelerators 820 or the cache memory manager 830. In one such approach, such an approach may require sending a Req/Ack handshake back to the cache memory manager 830 to finish the request.

In one example approach, distributed cache controller 804 includes a main system cache 812 used to store cache lines independently of local memories 834. In one such approach, system cache controller 806 determines whether a particular way or set is located in the main system cache 812 or in the local memory 834 in one of the subsystems 802. In one example approach, system cache controller 806 accesses a tag lookup as usual and, if the data corresponding to the address has been cached, then system cache controller 806 determines if the cache line is located in the main system cache 812 or in the local memory 834 in one of the subsystems 802 and proceeds accordingly.

In one such example approach, the system cache controller 806 may need to determine whether a particular way is located in the main system cache 812 or in the local memory 834 of one of the subsystems 802. In one example approach, system cache controller 806 performs a lookup as usual and, if the data corresponding to the address has been cached, system cache controller 806 determines the way or set in which the hit occurs. If the hit occurs in a way that is associated with the main cache then it is a normal cache operation. If the hit occurs in a way for which the actual cache is located in one of the subsystems 802 then the cache controller 706 makes a request to either the cache memory manager 830 in the subsystem 830 or to the appropriate local memory controller 832 in the subsystem 802.

If the operation is a read then the data response can be sent directly from the appropriate cache memory manager 830 to the initiator 820. In one example approach, this is done using a NoC proxy command. Although there is no point in sending the data back to the cache controller 806, there still should be a response back to the cache controller 806 indicating that a read response has been provided back to the initiator 820. The cache controller 806 may then retire the transaction. One example approach is to have the cache memory manager 830 send a multicast packet on the NoC, with one destination the original initiator and the second destination the cache controller 806. In one such approach, cache controller 806 ignores the read data and simply retires the cache transaction. In another such approach, in cases where cache controller 806 receives a second read request to the same address, cache controller 806 may use the data received via the read acknowledgment of the first read request to respond back with the data to the second read request.

In the case of a cache write (including a write allocate), in one example approach cache controller 806 may issue a write request to either the cache memory manager 830 in the subsystem or the appropriate local memory controller 832 in the subsystem. The write operation is completed and a response to the write request is sent back to the cache controller 806 to retire the transaction.

Another operation that is frequently performed is the flush operation. The flush operation for a way or set of ways is broken into individual cache line flush operations. In one example approach, the flush operation for a dirty cache line is sent over NoC 824 to the cache memory manager 830 in the appropriate subsystem 802. Cache memory manager 806 reads the dirty bit entry and send a response to cache controller 806 with the dirty data or dirty cache line. The dirty data or cache line is written to memory 566 after the appropriate TAG RAM entry in tag RAM 810 is invalidated.

Figure 10:
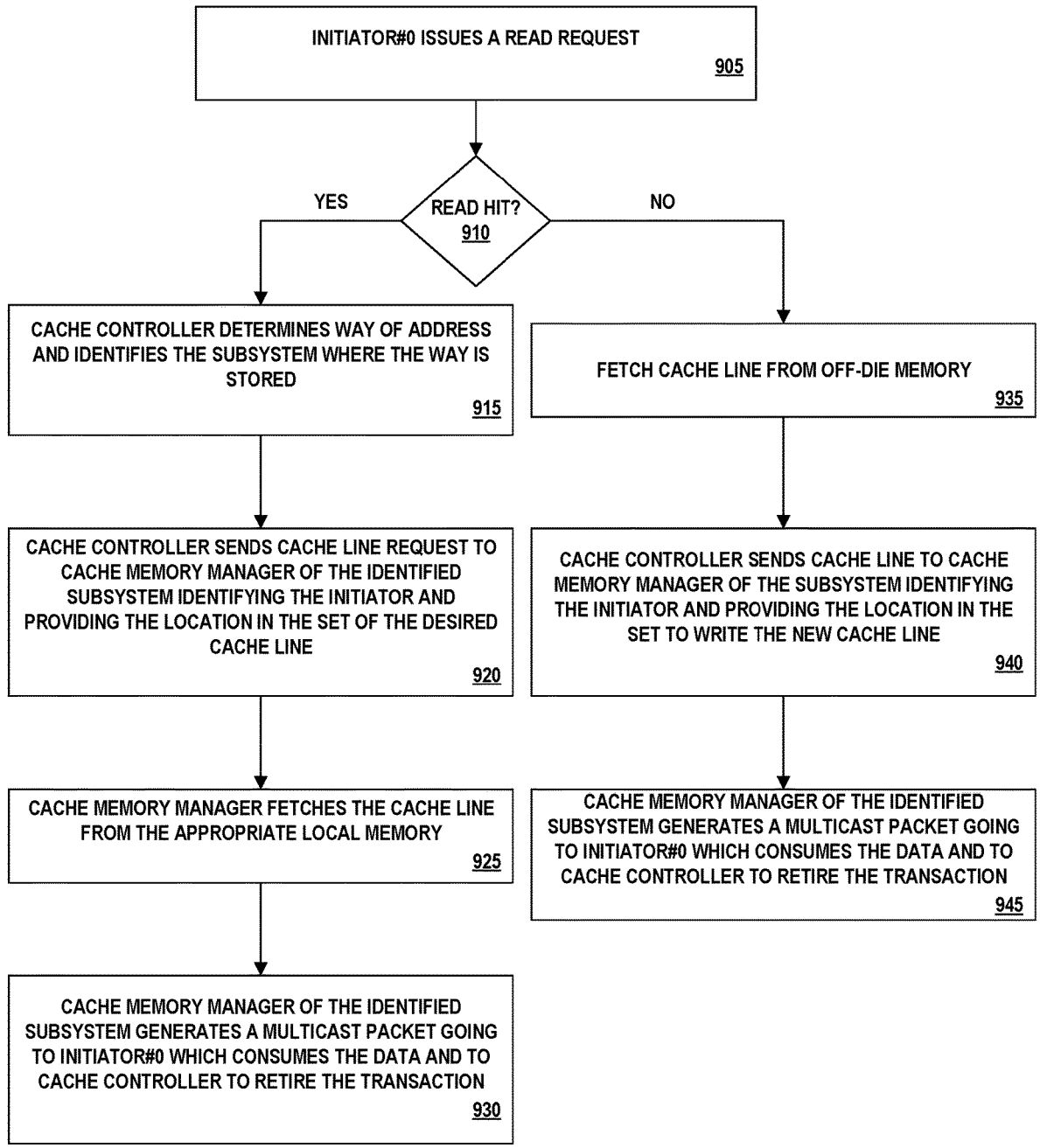
FIG. 10 is a flowchart illustrating example operations of a method for distributing cache sets to the local memory of computer elements, in accordance with techniques described in this disclosure.

FIG. 10 is a flowchart illustrating example operations of a method for distributing cache sets to the local memory of computer elements, in accordance with techniques described in this disclosure. In the example approach of FIG. 10, and as shown in FIG. 9, Initiator #0 (e.g., initiator 820.0) makes a read request to off-die memory 566 (905). The request is forwarded (1 of FIG. 9) through the cache controller 806, where a check is made to determine if the read request is to a block in cache in LMEM 834 (e.g., LMEM2 of subsystem 802B) (910). If the read request is to a block in cache (YES branch of 910), cache controller 806 determines (2 of FIG. 9), from the entry in tag RAM 810, the subsystem 802 and location in local memory 834 where the cache line is stored (915). For instance, cache controller 806 may perform a lookup in TAG RAM 810, determine that there is a hit in cache and that the way with the read address is associated with a cache located in Subsystem 802B.

Cache controller 806 sends a cache line request to the cache memory manager 830 in the target subsystem (3 of FIG. 9), indicating that the read response should be sent to Initiator #0 as a proxy for cache controller 806 (920). Cache memory manager 830 fetches the cache line (4 of FIG. 9) from the appropriate local memory (LMEM) 834 (925) and generates a communication to Initiator #0 to consume the data and a message to cache controller 806 retiring the read request transaction (5 of FIG. 9) (930). In one example approach, cache memory controller 830 sends a multicast packet at 5 of FIG. 9 with the read response going to Initiator #0 which consumes the data and to the cache controller 806 which will retire the transaction.

If, however, the read request is to a block that is not in cache (NO branch of 910), cache controller 806 fetches the cache line from memory 566 (935) and sends the fetched cache line to cache memory manager 830 of the subsystem of the way associated with the address in the read request (940). In some example approaches, cache controller 860 also determines the location in the set where the cache line is to be stored and sends that location to cache memory manager 830 of the subsystem 802.

Cache memory manager 830 then generates a communication to Initiator #0 to consume the data and a message to cache controller 806 retiring the read request transaction (930). In one example approach, cache memory controller 830 sends a multicast packet with the read response going to Initiator #0 which consumes the data and to the cache controller which will retire the transaction.

The hardware, software, and firmware described above may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

What is claimed is:

1. A system on a chip (SoC) comprising:
 a plurality of local memories, including a first local memory and a second local memory;
 a first subsystem comprising a first compute element and the first local memory, the first compute element connected to the first local memory;
 a second subsystem comprising a second compute element and the second local memory, the second compute element connected to the second local memory; and
 an N-way set associative cache controller, the set associative cache controller controlling an N-way set associative cache having a plurality of sets, wherein each location in a cacheable memory accessible to the SoC is mapped to one of the sets, wherein each set includes N locations for caching data blocks read from the cacheable memory, wherein N is an integer greater than one;
 wherein sets from the N-way set associative cache are mapped to one or more of the plurality of local memories when the respective local memories are not being used by local compute elements;
 wherein the set associative cache controller is configured to receive a read request having an address, to identify a data block in the cacheable memory associated with the address, to determine if the identified data block is in cache in one of the plurality of local memories, and, if the identified data block is in cache in one of the plurality of local memories, to fetch the identified data block from the cache;
 wherein, if the identified data block is not in cache in one of the plurality of local memories, the set associative cache controller is further configured to fetch the identified data block from the cacheable memory.

2. The SoC of claim 1, wherein the plurality of memories are addressable as shared memory.

3. The SoC of claim 1, wherein the local memories are Static Random-Access Memory (SRAM).

4. The SoC of claim 1, wherein, when the first compute element is executing an application in the first local memory, the set associative cache is further configured to disable, from caching, sets of the cache mapped to the first local memory, and
 wherein, when the second compute element is executing an application in the second local memory, the set associative cache is further configured to disable, from caching, sets of the cache mapped to the second local memory.

5. The SoC of claim 1, wherein the address includes a set number and a tag.

6. The SoC of claim 5, wherein, if the identified data block is not in cache in one of the plurality of local memories, the set associative cache controller is further configured to store the identified data block retrieved from the cacheable memory into a cache in local memory associated with the set number.

7. The SoC of claim 5, wherein, if the identified data block is not in cache in one of the plurality of local memories, the set associative cache controller is further configured to store the identified data block retrieved from the cacheable memory into a cache in one of the N locations in local memory associated with the set number.

8. An artificial reality system comprising:
a head mounted display (HMD) configured to output artificial reality content, the HMD including a display and at least one system on a chip (SoC), wherein the at least one SoC comprises:
  a plurality of local memories, including a first local memory and a second local memory;
  a first subsystem comprising a first compute element and the first local memory, the first compute element connected to the first local memory;
  a second subsystem comprising a second compute element and the second local memory, the second compute element connected to the second local memory; and
  an N-way set associative cache controller, the set associative cache controller controlling an N-way set associative cache having a plurality of sets, wherein each location in a cacheable memory accessible to the SoC is mapped to one of the sets, wherein each set includes N locations for caching data blocks read from the cacheable memory, wherein N is an integer greater than one;
  wherein sets from the N-way set associative cache are mapped to one or more of the plurality of local memories;
  wherein the set associative cache controller is configured to receive a read request having an address, to identify a data block in the cacheable memory associated with the address, to determine if the identified data block is in cache in one of the plurality of local memories, and, if the identified data block is in cache in one of the plurality of local memories, to fetch the identified data block from the cache;
  wherein, if the identified data block is not in cache in one of the plurality of local memories, the set associative cache controller is further configured to fetch the identified data block from the cacheable memory;
  wherein, when the first compute element is executing an application in the first local memory, the set associative cache is further configured to disable from caching sets of the cache mapped to the first local memory, and
  wherein, when the second compute element is executing an application in the second local memory, the set associative cache is further configured to disable from caching sets of the cache mapped to the second local memory.

9. The artificial reality system of claim 8, wherein the local memories are Static Random-Access Memory (SRAM).

10. The artificial reality system of claim 8, wherein the address includes a set number and a tag.

11. The artificial reality system of claim 10 wherein, if the identified data block is not in cache in one of the plurality of local memories, the set associative cache controller is further configured to store the identified data block retrieved from the cacheable memory into a cache in local memory associated with the set number.

12. The artificial reality system of claim 10, wherein, if the identified data block is not in cache in one of the plurality of local memories, the set associative cache controller is further configured to store the identified data block retrieved from the cacheable memory into a cache in one of the N locations in local memory associated with the set number.

13. In a system on a chip (SoC) having on-chip memory, cacheable memory and an N-way set associative cache controller having a plurality of sets, wherein the on-chip memory includes local memory distributed among a plurality of subsystems, a method of caching data from the cacheable memory in the local memory, the method comprising:
  receiving a read request from a processor, the read request having an address;
  identifying, based on the address, a set and a tag associated with the address;
  accessing a TAG memory associated with the set of the address to determine if data associated with the address is stored in the distributed local memory;
  if the data associated with the address is not stored in cache in the local memory and the local memory is not being used by a local compute element, reading the data associated with the address from the cacheable memory, forwarding the data read to the processor, storing the data in one of N-way locations of the set associated with the address, and storing the tag from the address in the TAG memory at the same respective way location; and
  if the data associated with the address is stored in cache in the local memory, reading data from the cache in the local memory based on the address in the read request and forwarding the data to the processor.

14. The method of claim 13, wherein storing the data in one of N way locations of the set associated with the address includes determining if one of the N way locations of the set associated with the address has data that may be replaced.

15. The method of claim 14, wherein determining if one of the N way locations of the set associated with the address has data that may be replaced includes determining if one or more of the N locations are dedicated as local memory to one of the subsystems.

16. The method of claim 13, wherein the local memory is addressable as shared memory.

17. The method of claim 13, wherein identifying a set and a tag associated with the address includes selecting X most significant bits of the address as the tag and Y next most significant bits as identifying the set of the address.

18. The method of claim 13, wherein the address includes a set number and a tag.

19. The method of claim 18, wherein accessing a TAG memory associated with the set of the address to determine if data associated with the address is stored in the local memory includes determining if the tag from the address matches a tag stored in one of the N way locations in the TAG memory associated with the set of the address.

20. The method of claim 18, wherein, if the data associated with the address is stored in cache in the local memory, reading data from the cache in the local memory based on the set of the address in the read request and forwarding the data to the processor.

* * * * *